*US010943192B2*

United States Patent
Tays et al.

(10) Patent No.: US 10,943,192 B2
(45) Date of Patent: Mar. 9, 2021

(54) METHOD AND SYSTEM FOR DISPLAYING WORK ASSIGNMENT STATUS INFORMATION IN CONNECTION WITH WORK TO BE PERFORMED ON A COMPONENT OF A LINEAR ASSET INFRASTRUCTURE

(71) Applicant: Canadian National Railway Company, Montreal (CA)

(72) Inventors: Dwight Tays, Edmonton (CA); David Lilley, Montreal (CA); Brian Abbott, Surrey (CA)

(73) Assignee: CANADIAN NATIONAL RAILWAY COMPANY, Montreal (CA)

( * ) Notice: Subject to any disclaimer, the term of this patent is extended or adjusted under 35 U.S.C. 154(b) by 0 days.

(21) Appl. No.: 16/678,725

(22) Filed: Nov. 8, 2019

(65) Prior Publication Data

US 2020/0090084 A1 Mar. 19, 2020

Related U.S. Application Data

(63) Continuation of application No. 14/466,510, filed on Aug. 22, 2014, now abandoned, which is a (Continued)

(51) Int. Cl.
*G06Q 10/06* (2012.01)
*G06F 16/248* (2019.01)
(Continued)

(52) U.S. Cl.
CPC .............. *G06Q 10/06* (2013.01); *B61L 23/04* (2013.01); *G06F 3/0482* (2013.01);
(Continued)

(58) Field of Classification Search
CPC ...... G06Q 10/06; G06Q 30/018; G06Q 50/06; G06Q 50/30; G06Q 10/063114;
(Continued)

(56) References Cited

U.S. PATENT DOCUMENTS 5,533,695 A 7/1996 Heggestad et al.
5,666,481 A 9/1997 Lewis
(Continued)

OTHER PUBLICATIONS

Transport Canada, "Rules Respecting Track Safety" Revised Nov. 3, 2008 (TC E-31), http://www.tc.gc.ca/media/documents/railsafety/TCE31en.pdf—29 pages.
(Continued)

*Primary Examiner* — Nicholas Ulrich
(74) *Attorney, Agent, or Firm* — Abelman, Frayne & Schwab

(57) ABSTRACT

The invention provides a graphical user interface implemented on a computer including an information area for displaying to a user at the computer inspection status information in connection with one or more components of a linear asset infrastructure. The graphical user interface also includes a control component operable by the user at the computer to cause the graphical user interface to display additional information on the one or more components of the linear asset infrastructure.

35 Claims, 31 Drawing Sheets

Related U.S. Application Data continuation of application No. 12/454,735, filed on May 20, 2009, now abandoned.

(60) Provisional application No. 61/071,849, filed on May 21, 2008.

(51) Int. Cl.

| | |
|---|---|
| *G06F 16/2455* | (2019.01) |
| *B61L 23/04* | (2006.01) |
| *G06F 40/174* | (2020.01) |
| *G06F 3/0482* | (2013.01) |
| *G06Q 50/30* | (2012.01) |
| *G06Q 30/00* | (2012.01) |
| *G06Q 50/06* | (2012.01) |

(52) U.S. Cl.
CPC ........ *G06F 16/248* (2019.01); *G06F 16/2455* (2019.01); *G06F 40/174* (2020.01); *G06Q 10/063114* (2013.01); *G06Q 30/018* (2013.01); *G06Q 50/06* (2013.01); *G06Q 50/30* (2013.01)

(58) Field of Classification Search
CPC .. G06F 40/174; G06F 16/248; G06F 16/2455; G06F 3/0482; B61L 23/04
See application file for complete search history.

(56) References Cited

U.S. PATENT DOCUMENTS

| | | | |
|---|---|---|---|
| 5,867,404 | A | 2/1999 | Bryan |
| 5,956,664 | A * | 9/1999 | Bryan .................. B61L 23/044 340/870.16 |
| 5,978,717 | A | 11/1999 | Ebersoehn et al. |
| 6,584,414 | B1 | 6/2003 | Green et al. |
| 6,594,591 | B2 | 7/2003 | Clark et al. |
| 6,600,999 | B2 | 7/2003 | Clark et al. |
| 6,772,098 | B1 | 8/2004 | Stark et al. |
| 7,111,241 | B2 | 9/2006 | Takats |
| 7,277,889 | B2 | 10/2007 | Addonisio et al. |
| 7,627,546 | B2 | 12/2009 | Moser et al. |
| 7,680,631 | B2 | 3/2010 | Selig et al. |
| 7,783,507 | B2 | 8/2010 | Schick et al. |
| 7,945,385 | B2 | 5/2011 | Villalobos et al. |
| 2001/0053970 | A1 | 12/2001 | Ford et al. |
| 2002/0007225 | A1 | 1/2002 | Costello et al. |
| 2002/0022984 | A1 | 2/2002 | Daniel et al. |
| 2002/0083630 | A1 | 7/2002 | Marcon |
| 2002/0084387 | A1 | 7/2002 | Matheson et al. |
| 2002/0166248 | A1 | 11/2002 | Carr et al. |
| 2003/0069716 | A1* | 4/2003 | Martinez ................ G06Q 10/06 702/188 |
| 2003/0223387 | A1 | 12/2003 | Davenport et al. |
| 2004/0010432 | A1 | 1/2004 | Matheson et al. |
| 2004/0128613 | A1* | 7/2004 | Sinisi .................... G06Q 10/00 715/203 |
| 2004/0260668 | A1* | 12/2004 | Bradford .......... G06Q 10/06311 |
| 2005/0023347 | A1 | 2/2005 | Wetzel et al. |
| 2005/0040224 | A1 | 2/2005 | Brinton et al. |
| 2005/0080569 | A1 | 4/2005 | Pedanekar |
| 2005/0171661 | A1 | 8/2005 | Abdel-Malek et al. |
| 2005/0182650 | A1 | 8/2005 | Maddox et al. |
| 2006/0017911 | A1 | 1/2006 | Villar et al. |
| 2006/0080158 | A1 | 4/2006 | Schweizer et al. |
| 2006/0195327 | A1* | 8/2006 | Kumar .................. G06Q 10/087 705/28 |
| 2006/0195550 | A1 | 8/2006 | Craik |
| 2006/0219123 | A1 | 10/2006 | Theurer |
| 2006/0259392 | A1* | 11/2006 | Rabenold ............... G06Q 10/10 705/37 |
| 2007/0027704 | A1 | 2/2007 | Patel et al. |
| 2007/0083398 | A1 | 4/2007 | Ivey et al. |
| 2007/0136029 | A1 | 6/2007 | Selig et al. |
| 2007/0217670 | A1 | 9/2007 | Bar-Am |
| 2007/0266782 | A1 | 11/2007 | Bartz et al. |
| 2007/0293997 | A1 | 12/2007 | Couch |
| 2008/0021718 | A1 | 1/2008 | Kaartinen et al. |
| 2008/0123934 | A1* | 5/2008 | Amidi ................ G05B 23/0229 382/141 |
| 2008/0154692 | A1 | 6/2008 | Logan et al. |
| 2008/0162081 | A1 | 7/2008 | Sato |
| 2008/0296441 | A1 | 12/2008 | Anderson et al. |
| 2009/0001226 | A1 | 1/2009 | Haygood |
| 2009/0076726 | A1 | 3/2009 | Gemignani et al. |
| 2009/0100419 | A1 | 4/2009 | Childress et al. |

OTHER PUBLICATIONS

Office Action dated Dec. 15, 2011, in connection with U.S. Appl. No. 12/454,735—13 pages.
Office Action dated Dec. 22, 2010, in connection with U.S. Appl. No. 12/454,736—7 pages.
Final Office Action dated Jul. 21, 2011, in connection with U.S. Appl. No. 12/454,736—9 pages.
Final Office Action dated May 21, 2012, in connection with U.S. Appl. No. 12/454,736—12 pages.
Office Action dated Dec. 22, 2010, in connection with U.S. Appl. No. 12/454,732—11 pages.
Final Office Action dated Jul. 12, 2011, in connection with U.S. Appl. No. 12/454,732—12 pages.
Office Action dated Jun. 6, 2014, in connection with U.S. Appl. No. 12/454,732—15 pages.
Final Office Action dated Nov. 24, 2014, in connection with U.S. Appl. No. 12/454,732—13 pages.
Office Action dated May 29, 2015, in connection with U.S. Appl. No. 12/454,732—10 pages.
Final Office Action dated Feb. 2, 2016, in connection with U.S. Appl. No. 12/454,732—12 pages.
Office Action dated Jul. 6, 2011, in connection with U.S. Appl. No. 12/454,731—9 pages.
Office Action dated Apr. 9, 2012, in connection with U.S. Appl. No. 12/454,731—38 pages.
Office Action dated Jul. 5, 2011, in connection with U.S. Appl. No. 12/454,734—8 pages.
Final Office Action dated Feb. 23, 2012, in connection with U.S. Appl. No. 12/454,734—17 pages.
Office Action dated Sep. 16, 2013, in connection with U.S. Appl. No. 12/454,734—20 pages.
Final Office Action dated Jun. 12, 2014, in connection with U.S. Appl. No. 12/454,734—17 pages.
Office Action dated Aug. 23, 2011, in connection with U.S. Appl. No. 12/454,737—21 pages.
Final Office Action dated Feb. 3, 2012, in connection with U.S. Appl. No. 12/454,737—31 pages.
Office Action dated Sep. 23, 2013, in connection with U.S. Appl. No. 12/454,737—23 pages.
Final Office Action dated Mar. 6, 2014, in connection with U.S. Appl. No. 12/454,737—38 pages.
Final Office Action dated Aug. 24, 2012, in connection with U.S. Appl. No. 12/454,735—14 pages.
Office Action dated Sep. 13, 2012, in connection with U.S. Appl. No. 12/454,736—9 pages.
Final Office Action dated Dec. 28, 2012, in connection with U.S. Appl. No. 12/454,731—29 pages.
Notice of Allowance dated Jul. 17, 2013, in connection with U.S. Appl. No. 12/454,736—10 pages.
Office Action dated Sep. 21, 2016, in connection with U.S. Appl. No. 14/567,376—19 pages.
Final Office Action dated Jun. 29, 2017, in connection with U.S. Appl. No. 14/567,376—23 pages.
Office Action dated Aug. 2, 2017, in connection with U.S. Appl. No. 14/466,510—32 pages.
Final Office Action dated Apr. 12, 2018, in connection with U.S. Appl. No. 14/466,510—13 pages.
Examiner's Report dated Jan. 28, 2015, in connection with Canadian patent application No. 2,639,093—4 pages.

(56) References Cited

OTHER PUBLICATIONS

Examiner's Report dated Dec. 3, 2016, in connection with Canadian patent application No. 2,639,093—4 pages.
Examiner's Report dated Dec. 16, 2016, in connection with Canadian patent application No. 2,639,093—3 pages.
Examiner's Report dated Nov. 28, 2018, in connection with Canadian patent application No. 2,992,198—5 pages.
Office Action dated Nov. 5, 2018, in connection with U.S. Appl. No. 14/466,510—10 pages.
Notice of Allowance dated Nov. 14, 2018, in connection with U.S. Appl. No. 14/567,376—12 pages.
Notice of Allowance and Fees Due dated Aug. 27, 2019 in connection with U.S. Appl. No. 16/274,495—13 pages.
Notice of Allowance and Fees Due dated Aug. 8, 2019 in connection with U.S. Appl. No. 14/466,510—8 pages.
Examiner's Report dated Nov. 13, 2019 in connection with Canadian patent application No. 2,992,198—3 pages.
Examiner's Report dated Jul. 13, 2020 in connection with Canadian patent application No. 3,077,295—5 pages.
U.S. Department of Transportation, Federal Railroad Administration, "Track Inspection Time Study", Jul. 2011, http://www.fra.dot.gov/downloads/TR_Track_Inspection_Time_Study_final_0912., pdf—106 pages.
Lee, Yoon-Si. Development of a structural health monitoring system for bridges and components. Iowa State University, ProQuest, UMI Dissertations Publishing; 2007—313 pages.
Office Action dated Dec. 9, 2011, in connection with U.S. Appl. No. 12/454,736—10 pages.
Office Action dated Jan. 8, 2018, in connection with U.S. Appl. No. 14/567,376—23 pages.
Examines Report dated Jul. 13, 2020 in connection with Canadian patent application No. 3,077,184—3 pages.
Examiner's Report dated Sep. 3, 2020 in connection with Canadian patent application No. 2,992,198—6 pages.
Examiner's Report dated Sep. 11, 2020 in connection with Canadian Patent Application No. 3,089;115—5 pages.
Examiner's Report dated Sep. 17, 2020 in connection with Canadian Patent Application No. 3,077,184—5 pages.
Examiner's Report dated Nov. 4, 2020 in connection with Canadian Patent Application No. 2,992,198—3 pages.
Examiner's Report dated Nov. 6, 2020 in connection with Canadian Patent Application No. 3,077,295—3 pages.

* cited by examiner

FIG. 3

Plant Inventory  |  Track Inspections  [New] [Resume] [Summary]  |  Feature Inspection [New] [Summary]  |  Work List Territory Overview

Track Inspection Status 302

| Subdivision 300 | Overdue | Due | Completed |
|---|---|---|---|
| 241 | 13 | 1 | 165 |
| 270 | 0 | 0 | 78 |
| Total | 13 | 1 | 243 |

Condition Summary 332

| Severity | New | Outstanding Overdue | Outstanding All | Completed Yesterday | Completed Last Week |
|---|---|---|---|---|---|
| Urgent | 0 | 8 | 9 | 0 | 0 |
| Near Urgent | 0 | 2 | 3 | 0 | 0 |
| Priority | 0 | 6 | 6 | 0 | 0 |
| Total | 0 | 16 | 18 | 0 | 0 |

Feature Inspection Status 312

| Feature 324 | Overdue | Due | Completed |
|---|---|---|---|
| Bridge | 0 | 0 | 0 |
| Derail | 0 | 0 | 0 |
| Joint & Joint Bar | 0 | 0 | 0 |
| Lubricator | 6 | 3 | 1 |
| Road Crossing | 0 | 0 | 213 |
| Track Crossing | 8 | 1 | 1 |
| Turnout | 397 | 2 | 19 |
| 320 Total | 411 | 6 | 234 |

Work Center Summary 350

| Work Center 352 | Outstanding Urgent | Outstanding Near Urgent | Outstanding Priority | Completed Yesterday | Completed Last Week |
|---|---|---|---|---|---|
| Unassigned 356 | 9 | 3 | 6 | 0 | 0 |
| CC10280 SUBAUDIT-21 (Z4IT/R21) | 0 | 0 | 0 | 0 | 0 |
| CC10280 SUBAUDIT-22 (Z4IT/R22) | 0 | 0 | 0 | 0 | 0 |
| CC10280 SUBAUDIT-23 (Z4IT/R23) | 0 | 0 | 0 | 0 | 0 |
| CC10553 SUBAUDIT-31 (Z4IT/S31) | 0 | 0 | 0 | 0 | 0 |
| CC10553 SUBAUDIT-31 (Z4IT/S31) | 0 | 0 | 0 | 0 | 0 |

FIG. 5

Window 500:

Buttons: Modify Component | Record Cond | Record ToDo | Cond History | Apply Zone | Back | Apply Filter | Expand/Collapse

| Sel | ◆Object | ◆Zone | ◆Sub | ◆Trk | ◆Local ID | ◆MF | ◆MT | ◆Joint MP | ◆Track Class |
|---|---|---|---|---|---|---|---|---|---|
| ☐ | Track | | 241 | 01 | | 38.72 | 74.23 | | ML |
| ☐ | Curve | | 241 | 01 | | 52.65 | 53.16 | | |
| ☐ | Curve | | 241 | 01 | | 54.81 | 55.12 | | |
| ☐ | Curve | | 241 | 01 | | 55.59 | 56.08 | | |

Window 502:

Buttons: Quick Pass | Record Cond | Record ToDo | Apply Zone | Create Feature | Modify Component | Back | Apply Filter | Expand/Collapse

| Sel | SW Thr ◆Stat | Insp. Form | ◆Obj | ◆Zone | ◆Local ID | ◆Sub | ◆Trk | ◆MP | ◆Freq | ◆Last Insp | ◆Last Throw | ◆Last Annual |
|---|---|---|---|---|---|---|---|---|---|---|---|---|
| ☐ | ▨ | ▨ | Road Crossing | | | 241 | 01 | 38.74 | | | | |
| ☐ | ▨ | ▨ | Road Crossing | | | 241 | 01 | 38.80 | | | | |
| ☐ | ● | ▨ | Turnout | | | 241 | 01 | 38.86 | | 15-Aug-2007 | | 15-Aug-2007 |
| ☐ | ▨ | ▨ | Track Crossing | | | 241 | 01 | 38.90 | | | | |

FIG. 6

| Feature Description | | |
|---|---|---|
| Functional Location | TR00031385 | |
| Desciption | TR00031385 | |
| Work Center | | |

GPS

| Latitude | |
| Longitude | |

| Current GPS | Latitude | Longitude |
|---|---|---|

Location

| Local ID | Division | Subdivision | Track ID | Mile Point | Track Name | Prov/State | Country |
|---|---|---|---|---|---|---|---|
| | Montreal | 241 ▼ | 01 | 54.81 | ST-HYACINTHE S/D | QC | CA |

| T&R Zone | | T&R Track Plant | |
|---|---|---|---|
| Track Planner Group | | Longitude To | |
| Longitude From | | Latitude To | |
| Latitude From | | | |

602 — Submit   Cancel

Outstanding Condition List

| P | Subs | Trk | MP | Obj | Condition | Rpt By | Assigned | Operation | Date | Due |
|---|---|---|---|---|---|---|---|---|---|---|
| 5 | 308 | 04 | 67 | Track | | XT10752 | E32TO100 | | 2007-09-13 | |
| | 308 | 04 | 76 | Track | Damaged by Rolling Stock | XT10752 | E32TO100 | | 2007-08-21 | 2007-08-22 |
| 1 | 308 | 04 | 76 | Track | ALC31 Alignment Curve 31' | XT10752 | E32TO100 | | 2007-08-21 | 2007-08-22 |
| 1 | 308 | 04 | 65 | Track | ALC31 Alignment Curve 31' | XT10752 | E32TO100 | | 2007-09-07 | 2007-09-08 |
| 1 | 308 | 04 | 71 | Track | ALC31 Alignment Curve 31' | XT10752 | E32TO100 | | 2007-09-13 | 2007-09-14 |
| 3 | 308 | 04 | 75 | Track | Indication of potential track buckle | MIUSER 01 | E32TO100 | | 2007-10-11 | |
| 3 | 308 | 04 | 29 | Track | Broken Bar | MIUSER 10 | E32TO1WA | | 2007-10-11 | |
| 3 | 308 | 04 | 29 | Track | Base Other | MIUSER 10 | E32TO1WA | | 2007-10-11 | |
| 3 | 308 | 04 | 29 | Track | Torch cut or burned hole in rail | MIUSER 10 | E32TO1WA | | 2007-10-11 | |
| 5 | 308 | 04 | 71 | Track | | XT10752 | E32TO1TB | | 2007-09-13 | |
| 1 | 308 | 04 | 7 | Track | ALC31 Alignment Curve 31' | XT10752 | E32TO1TA | | 2007-09-13 | |
| 1 | 308 | 04 | 81 | Track | ALC31 Alignment Curve 31' | XT10752 | E32TO1WA | | 2007-09-13 | |
| 1 | 308 | 04 | 7 | Track | Damaged by Rolling Stock | XT10752 | E32TO1TA | No condition found – cleared – Rail | 2007-08-17 | |
| 1 | 308 | 04 | 75 | Track | ALC31 Alignment Curve 31' | MIUSER 01 | E32TO100 | | 2007-10-11 | 2007-10-12 |

Submit  Cancel

Condition Details

Location

| Code: | Description |
|---|---|
| VTIN ▼ | Visual Track Inspection by T&R |

| Object | Sub Track | MP | Latitude | Longitude | Recover |
|---|---|---|---|---|---|
| Track | 30804 | 0.75 | 0.0 | 0.0 | |

| | Latitude | Longitude |
|---|---|---|
| Current GPS | 0.0 | 0.0 |

Comments:

Condition Details

| Set | Item | Component | Condition | Trk Side | Position | Size | Pri | Remedial Action | Corrective Action | Status | In Svc Failure |
|---|---|---|---|---|---|---|---|---|---|---|---|
| ○ | 1.1 | Track (General) | Indication of potential track buckle | L | | | P1 | TSO: Temporary Order | | | ☐ |

(Add) (Change) (Delete) (Rail Detail Form) (Joint Bar Form) — 1001

Maintenance Activities

| Set | Item | Operation Number | Operation – Corrective Action | Planned Hours | Assigned Work Center | Due Date | Time |
|---|---|---|---|---|---|---|---|

1002

(Add) (Change) (Delete) (Complete) (Save) (Cancel/Back)
1004   1006   1008   1010

Work List — Hello, Daniel Gamelin ( Assign ) ( Duplicate ) ( Group ) ( Chg Location ) ( Details ) ( Back ) ( Apply Filter )   ☒ ▦ Expand/Collapse   Total: 22

| Sel | P | Sub | Trk | MP | Obj | Condition | Remedial Action | Assigned | Operation | Date | Due |
|---|---|---|---|---|---|---|---|---|---|---|---|
| ☐ | | | | | | | | | | | |
| ☐ | NU | 241 | 01 | 40.6 | Track | Broken Bar | Operate under authority R Action Taken | E22TO300 | | 04-Sep-2007 | |
| ☐ | UR | 241 | 01 | 38.82 | Track | Broken Bar | monitor condition Schedule repair R Ac | E22TO300 | | | |
| ☐ | NU | 241 | 01 | 38.85 | Track | Broken Bar | | E22TO300 | | | |
| ☐ | UR | 241 | 01 | 71.35 | Bridge | Broken Rail Other | Repair before next train | E22TO300 | | 22-Aug-2007 | 25-Aug-2007 |
| ☐ | UR | 241 | 01 | 72.03 | Track | Broken Base | Repair before next train | E22TO300 | | 14-Aug-2007 | 15-Aug-2007 |
| ☐ | UR | 241 | 01 | 72.03 | Track | ALC31 Alignment Curve 31 | Repair before next train | E22TO300 | | 22-Aug-2007 | 23-Aug-2007 |
| ☐ | UR | 241 | 01 | 72.04 | Track | ALC31 Alignment Curve 31 | Repair before next train | E22TO300 | | 27-Aug-2007 | 28-Aug-2007 |
| ☐ | | 241 | 01 | 73 | Track | ALC31 Alignment Curve 31 | Repair before next train | E22TO300 | | 24-Aug-2007 | 25-Aug-2007 |
| ☐ | UR | 241 | 01 | 73 | Track | ALC31 Alignment Curve 31 | Repair before next train | E22TO300 | | 27-Aug-2007 | 28-Aug-2007 |
| ☐ | UR | 241 | 01 | 73 | Track | ALC31 Alignment Curve 31 | Track taken out of service | E22TO300 | | 27-Aug-2007 | 28-Aug-2007 |

Track Inspection Confirmation — 3500

| Sel | P | Sub | Trk | MP | Obj | Condition | Remedial Activity | Assigned | Operation | Date | Due |
|---|---|---|---|---|---|---|---|---|---|---|---|
| ☐ | P2 | 270 | 01 | 1.81 | Turnout | ALC31 Alignment Curve 31' | Monitor | E22TO300 | | 04-Sep-2007 | |
| ☐ | P2 | 270 | 01 | 1.82 | Turnout | ALC31 Alignment Curve 31' | Monitor | E22TO300 | | 04-Sep-2007 | |
| ☐ | P2 | 270 | 01 | 2.03 | Turnout | ALC31 Alignment Curve 31' | Monitor | E22TO300 | | 04-Sep-2007 | |
| ☐ | UR | 270 | 01 | 2.91 | Turnout | Bolt Hole | Repair before next train | E22TO300 | | 04-Sep-2007 | 05-Sep-2007 |

Assign · Duplicate · Group · Chg Location · Details · Back · Apply Filter · Expand/Collapse · Total: 5

METHOD AND SYSTEM FOR DISPLAYING WORK ASSIGNMENT STATUS INFORMATION IN CONNECTION WITH WORK TO BE PERFORMED ON A COMPONENT OF A LINEAR ASSET INFRASTRUCTURE

CROSS REFERENCE TO RELATED APPLICATIONS

This application is a continuation of U.S. patent application Ser. No. 14/466,510, filed on Aug. 22, 2014, which is a continuation of U.S. patent application Ser. No. 12/454,735, filed on May 20, 2009, which claims the benefit under 35 U.S.C. 119(e) of U.S. Provisional Patent Application No. 61/071,849 filed May 21, 2009. The contents of the above-mentioned patent applications are incorporated herein by reference.

FIELD OF THE INVENTION

The invention relates to methods, systems and individual components thereof for performing inspection of linear assets, such as a railway infrastructure, a water distribution infrastructure, an oil distribution infrastructure, a gas distribution infrastructure and an electricity distribution infrastructure, among others.

BACKGROUND OF THE INVENTION

Companies that use linear assets in the course of their commercial activities are required to implement a structured process to inspect those assets. One example of linear assets is a railway infrastructure. A railway infrastructure includes many miles of tracks over which trains travels. A component of the management operation includes inspecting the tracks and performing repairs when necessary. Currently, track inspections can be done either manually or with the assistance of automated measuring equipment to supplement the manual inspection. However, the results of those inspections are handled manually. Reports, which usually consist of paper forms that are hand filled by the inspector after the inspection is completed, are processed by supervisors or managers to ensure that an adequate follow-up is performed. A follow-up may include additional inspections to a potentially problematic track section, the imposition of temporary remedial actions to reduce the risks of incidents or the scheduling of corrective action.

When the railway infrastructure is extensive, it becomes difficult and tedious to manage the inspection process and any follow-up activities by relying on largely manual information flow systems.

Accordingly, there is a clear need in the industry to develop an automated approach to linear asset management, in particular to railway infrastructure management such as to improve the efficiency of operations.

SUMMARY OF THE INVENTION

As embodied and broadly described herein the invention provides a graphical user interface implemented on a computer, including an information area for displaying to a user at the computer inspection status information in connection with one or more components of a linear asset infrastructure and a control component operable by the user at the computer to cause the graphical user interface to display additional information on the one or more components of the linear asset infrastructure.

As embodied and broadly described herein the invention also provides a graphical user interface implemented on a computer, including:
  a) an information area for displaying to a user at the computer condition status information in connection with conditions recorded against one or more components of a linear asset infrastructure, wherein the conditions being indicative of deviations from operational requirements of the one or more components;
  b) a control component operable by the user at the computer to cause the graphical user interface to display additional information on the one or more conditions.

As embodied and broadly described herein, the invention further provides a graphical user interface implemented on a computer, including:
  a) an information area for displaying to a user at the computer work assignment status information in connection with one or more work assignments to be performed on components of a linear asset infrastructure;
  b) a control component operable by the user at the computer to cause the graphical user interface to display additional information on the one or more work assignments.

As embodied and broadly described herein, the invention also provides a graphical user interface implemented on a computer for recording conditions against components of a linear asset infrastructure, the graphical user interface including:
  a) a first input area to receive information input by a user for identifying a component against which an actual condition is to be recorded, the actual condition being indicative of a deviation from an operational requirement of the component;
  b) a second input area to receive information input from the user to describe the actual condition, the second information area displaying to the user a set of input options, the options in the set corresponding to conditions that can possibly be associated with the component, the set of input options allowing the user to select an input option that matches the actual condition to provide a description of the actual condition in the second input area.

As embodied and broadly described herein the invention further includes a graphical user interface implemented on a computer to record an inspection of a component in a linear asset infrastructure, the graphical user interface including:
  a) an information display area to display an identification of the component, wherein the component has a certain length;
  b) an input area for receiving information input by a user indicative of a length of a portion of the component on which an inspection was performed, wherein the length of the component on which the inspection was performed is less than the certain length;
  c) a control component operable by the user at the computer to cause the graphical user interface to display additional information on a portion of the component on which the inspection was not performed.

As embodied and broadly described herein, the invention further provides a graphical user interface implemented on a computer to record an inspection of a component in a linear asset infrastructure, the graphical user interface including:
  a) an information display area to display in a list format a plurality of entries, each entry being associated with a component, each entry including a field to display information identifying the respective component;
  b) the information display area including an information input area associated with each entry to allow a user to input at the computer information in connection with an inspection performed on the component associated with the entry;
  c) a control component associated with each entry and being operable by the user at the computer to cause the graphical user interface to re-order the display such that entries associated with components that are geographically in proximity to one another appear as a group in the information display area.

As embodied and broadly described herein, the invention also provides a method for recording a condition in connection with a component of a linear asset infrastructure, the method including:
  a) entering information at a computing device via a graphical user interface to identify the component or a sub-component of the component;
  b) performing a search in the database on the basis of the information entered at the computing device to generate a set of possible conditions that may affect the component;
  c) displaying to a user at the computer the possible conditions, whereby the graphical user interface allows the user to select a condition among the possible conditions that matches the actual condition of the component to be recorded;
  d) in response to the selection creating a condition record in the database that associates the component with the selected condition.

As embodied and broadly described herein, the invention also provides a system for recording a condition in connection with a component of a linear asset infrastructure, the system including:
  a) a graphical user interface implemented on a computing device allowing a user to enter information to identify the component or a sub-component of the component;
  b) program code for:
    i) performing a search in a database on the basis of the information entered at the computing device to generate a set of possible conditions that may affect the component;
    ii) directing the graphical user interface to display to a user at the computer the possible conditions, whereby the graphical user interface allows the user to select a condition among the possible conditions that matches the actual condition of the component to be recorded;
    iii) in response to the selection creating a condition record in the database that associates the component with the selected condition.

As embodied and broadly described herein, the invention also provides a method for performing inspection of an asset of a linear asset infrastructure, the method including:
  a) traversing the asset with a device including a probe to perform inspection of the asset;
  b) storing data on a storage device conveying inspection information derived from the probe;
  c) processing the data with a computer for:
    i) determining if the inspection information is indicative of an abnormality in the asset;
    ii) selecting an asset defect among a set of possible asset defects on the basis of the abnormality, wherein the selected defect is a likely asset condition that is the source of the abnormality;
    iii) creating for the selected defect a condition record, the condition record being indicative of the selected asset defect.

As embodied and broadly described herein, the invention also provides a method for managing an inspection process in connection with linear assets of a linear assets infrastructure, the method including:
  a) storing in a database entries associated with respective components of the linear assets infrastructure;
  b) associating an inspection due date with each entry;
  c) driving an inspection status indicator in a graphical user interface which provides an indication to a human operator of the inspection status of the component associated with the entry at least in part on the basis of the inspection due date.

As embodied and broadly described herein, the invention further provides a system for assisting a user to manage an inspection process in connection with linear assets of a linear assets infrastructure, the system including:
  a) a database storing:
    i) entries associated with respective components of the linear assets infrastructure;
    ii) inspection due date data associated with each entry;
  b) a graphical user interface implemented on a computing device which provides an inspection status indicator, the inspection status indicator providing information to the user on the inspection status of the component associated with the entry;
  c) program code for driving the inspection status indicator at least in part on the basis of the inspection due date data.

BRIEF DESCRIPTION OF THE DRAWINGS

A detailed description of examples of implementation of the present invention is provided hereinbelow with reference to the following drawings, in which:

FIG. 3 is a diagram and example of an on-screen display for showing to the user a dashboard that consolidates and organizes railway infrastructure inspection information;

FIG. 5 is a diagram and example of an on-screen display which shows to a user a railway infrastructure inventory report, produced as a result of a query by using the tool shown in FIG. 4. The railway infrastructure inventory report lists components of the railway infrastructure and also shows inspection status information;

FIG. 6 is a diagram and example of an on-screen display allowing the user to modify a feature of the railway infrastructure;

Figure 7:
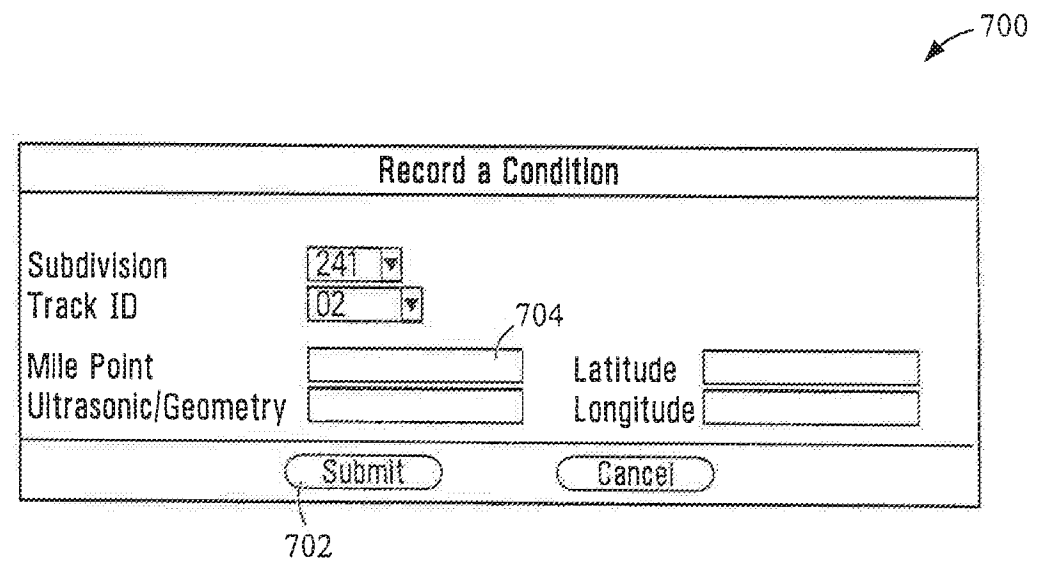

FIG. 7 is a diagram and example of an on-screen display allowing a user to record a condition arising in the railway infrastructure;

FIG. 8 is a diagram and example of an on-screen display allowing a user to record a new condition in connection with a component of the railway infrastructure;

FIG. 9 is a diagram and example of an on-screen display showing to a user a list of outstanding conditions recorded in connection with a component of the railway infrastructure;

FIG. 10 is a diagram and example of an on-screen display showing a conditions summary in connection with a component of the railway infrastructure;

FIG. 11 is a diagram and example of an on-screen display allowing a user to schedule a maintenance activity on a component of the railway infrastructure;

FIG. 13 is a diagram and example of an on-screen display showing a track inspection summary list;

FIG. 15 is a diagram and example of an on-screen display showing a list of feature inspection entries;

FIG. 17 is a diagram and example of an on-screen display showing a list of scheduled work activities;

FIG. 33 is a diagram and example of an on-screen display showing conditions recorded against a track segment;

Figure 1:
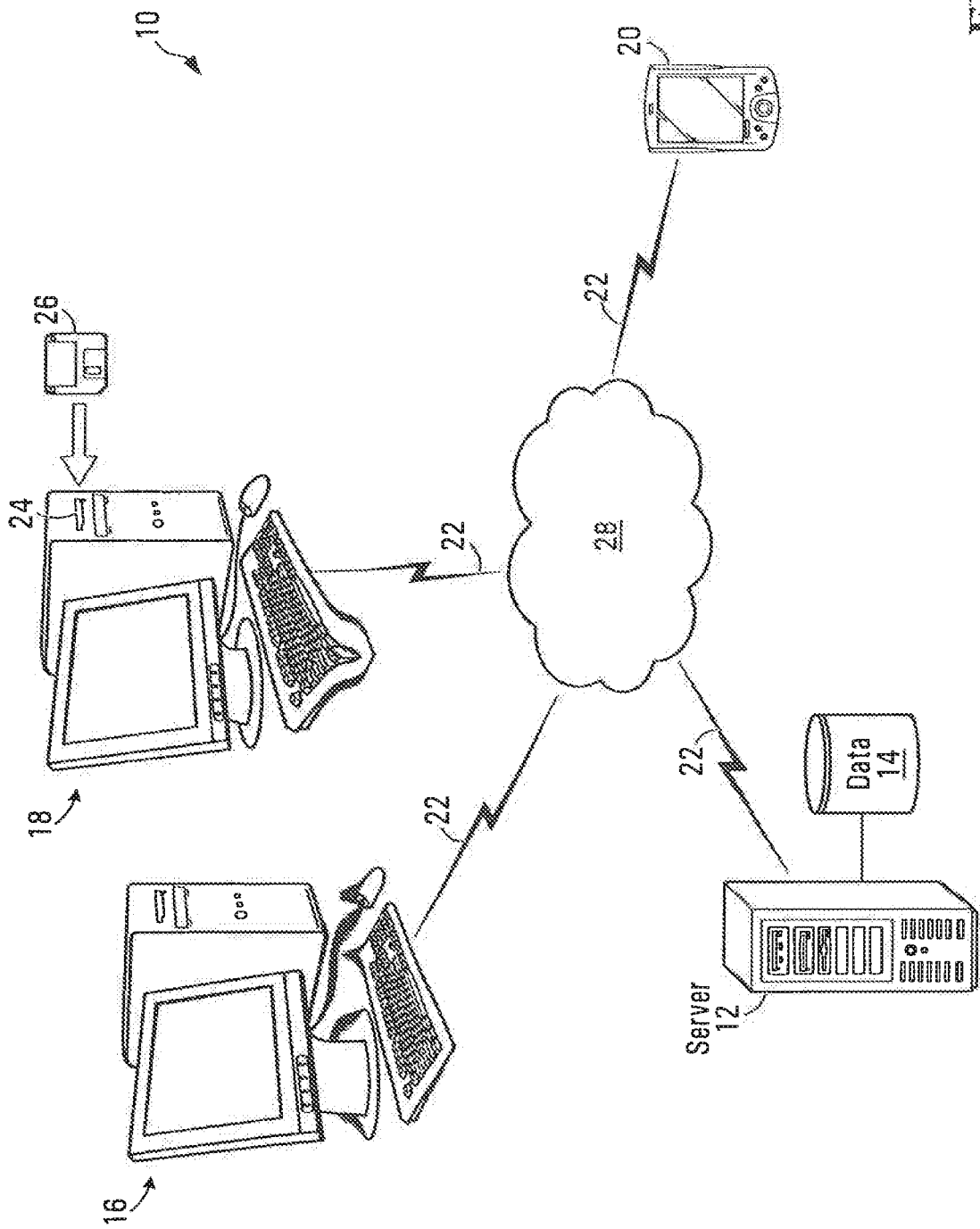
FIG. 1 is a high level block diagram of a railway infrastructure management system according to a non-limiting example of implementation of the invention.

In the drawings, embodiments of the invention are illustrated by way of example. It is to be expressly understood that the description and drawings are only for purposes of illustration and as an aid to understanding, and are not intended to be a definition of the limits of the invention.

DETAILED DESCRIPTION

FIG. 1 is a block diagram of a railway infrastructure management system according to a non-limiting example of implementation of the invention. The railway infrastructure management system 10 is implemented on a network-based computer platform, but other types of implementation such as an implementation using one or more stand-alone computers can be used without departing from the spirit of the invention.

The railway infrastructure management system 10 includes a server 12 which performs data processing functions and manages access to a database 14. The database 14 stores information about the various components of the railway infrastructure that is being managed, components inspection information, inspection schedules and maintenance information, among others.

In the example shown in the drawing, the database 14 is connected directly to the server 12. Note that many other arrangements are possible without departing from the spirit of the invention. For instance, the database 14 may be placed at any suitable location, as long as it can be accessed to by the various network devices to read the data or write data to it. Note that while the database 14 is shown as a single component, this is for illustration purposes only. In practice, the database 14 may include a single information storage unit or several information storage units, without departing from the spirit of the invention.

The railway infrastructure management system 10 also includes workstations 16, 18 and 20 at which users interact with the system. Workstations 16 and 18 are shown as desktop units while the workstation 20 is a mobile device such as a Personal Digital Assistant (PDA) or a laptop computer.

The workstations 16, 18 and 20 communicate with the server 12 over communication links 22. The communication links 22 may be wireline or wireless. In the case of the workstation 20, the communication link 22 can be wireless to permit mobility. Alternatively, the communication link can be wireline and can be established only when the workstation is synchronized with the remainder of the system, such as when the workstation 20 connects to the network. During the time the workstation 20 is not connected to the network, the workstation 20 works in an offline mode where data can be collected by the workstation 20 and uploaded to the network connection when the network connection is restored.

At least one of the workstations 16, 18 and/or 20, in this case the workstation 18, has a reader 24 to read data stored on a removable storage device 26. Any suitable reader and removable storage device can be used without departing from the spirit of the invention. The removable storage device contains information derived from an automated inspection device, for processing by the server 12. The automated inspection device will perform automatically an inspection of one or more components of the railway infrastructure and generate inspection data. This data is stored on the removable storage device 26.

The various components of the railway infrastructure management system 10 can communicate via any suitable data communications network 28. In the example shown, the data communications network 28 can be the Internet or any other suitable network.

Figure 2:
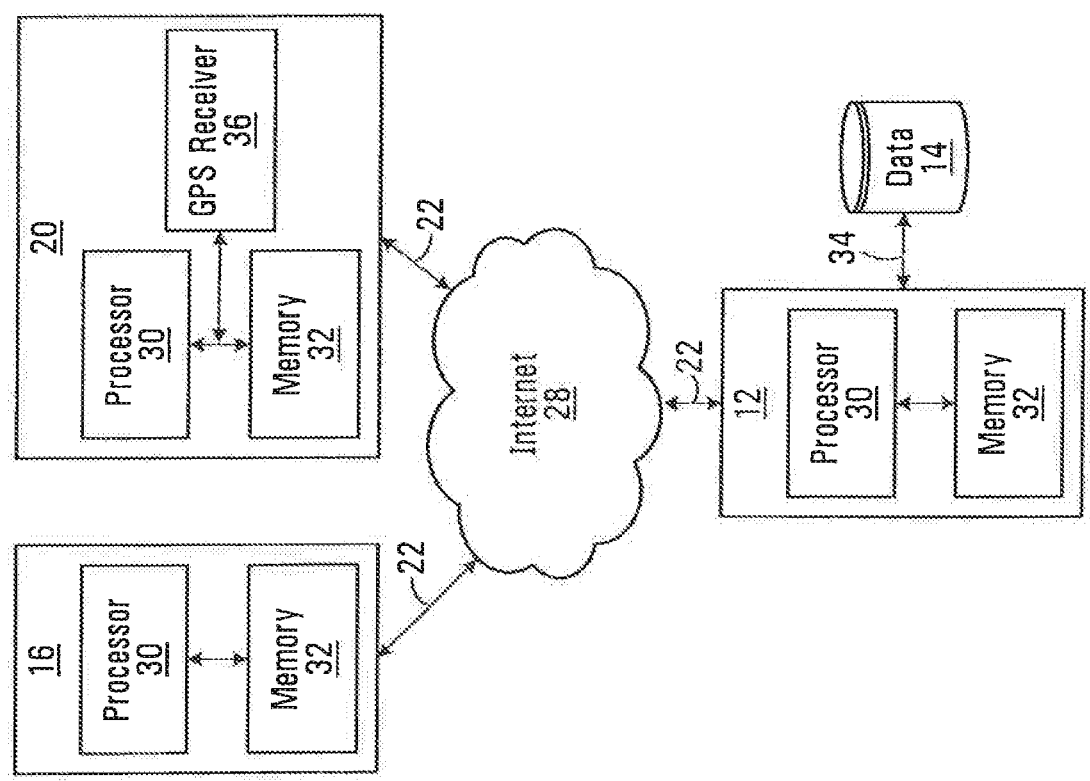
FIG. 2 is a more detailed block diagram of the railway infrastructure management shown in FIG. 1.

FIG. 2 is more detailed block diagram of the railway infrastructure management system 10. The server 12 is a computing platform that includes a processor 30 that executes software and which provides the core system functionality. The processor 30 communicates with a memory 32 in which are stored the program instructions executed by the processor 30 and also data on which processing is being performed. The server communicates with the database 14 over a communication link 34. Data that is stored in the database 14 or that is read from the database 14 is conveyed over the communication link 34.

The workstations 16 and 20 use a computing platform having a processor and a memory that is similar to the one used by the server 12 and for that reason the explanation above will not be repeated. One of the major differences between the workstation 20 and the workstation 16 resides in the use of a Global Positioning System (GPS) receiver 36 which allows picking up GPS satellite signals, processing the signals and generating location information. That location information that indicates the position of the workstation 20 is conveyed to the processor 30 of the workstation 20. Note that the GPS receiver 36 is only one possible way of generating location information. Another option is to use cell phone triangulation.

Figure 18:
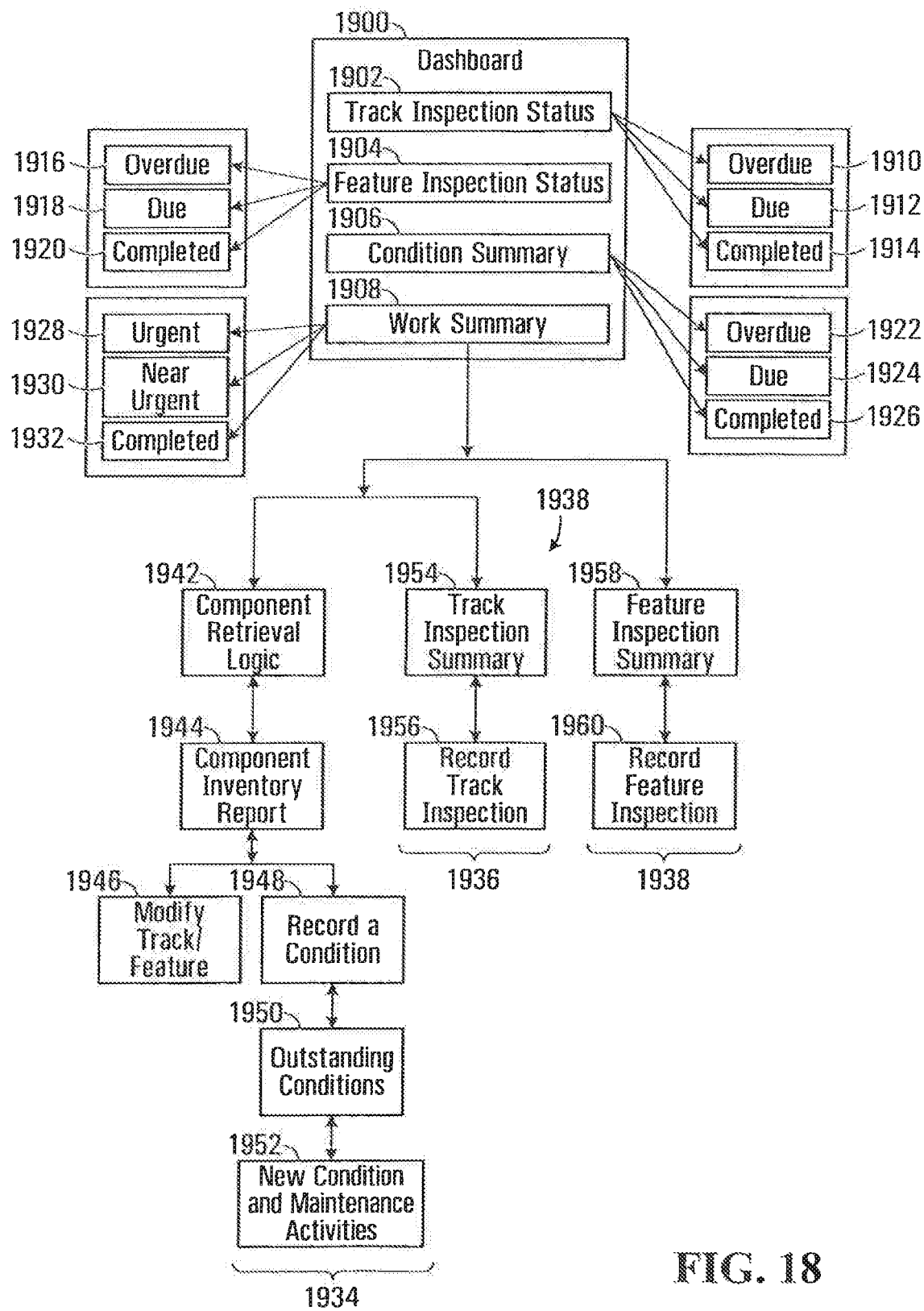
FIG. 18 is functional diagram of a software for implementing the railway infrastructure management system, according to a non-limiting example of implementation of the invention.

FIG. 18 is a block diagram illustrating the operation of the railway infrastructure management system 10 from the perspective of an end user. Typically, this user would be an individual that is responsible for performing management of the railway infrastructure, such as scheduling inspections, or maintenance operations on the railway infrastructure. The user interacts with the railway infrastructure management system 10 via the workstations 16, 18 and 20, and more particularly via the user interfaces of those workstations. The user interfaces allow the user to obtain information from the railway infrastructure management system 10 and also to input information. In a specific and non-limiting example of implementation, the user interfaces are Graphical User Interfaces (GUI). Without intent of being bound by a specific definition, a GUI would typically include means to deliver visually information to the user, such as a display, and also graphical tools allowing the user to make selections and input commands.

In a specific and non-limiting example of implementation, the GUI implements a dashboard 1900 that consolidates information and presents it to the user in a way that is easy to read and understand. The dashboard 1900 consolidates four different classes of information, namely track inspection status information 1902, feature inspection status information 1904, conditions summary information 1906 and work summary information 1908.

The track inspection status information shows to the user track segments of the railway infrastructure on which inspection is overdue 1910, track sections on which inspection is due 1912 and track sections on which the inspection has been completed 1914. The feature inspection status information shows features of the railway infrastructure on which inspection is overdue 1916, inspection is currently due 1918 and inspection has been completed 1920. The conditions summary information shows to the user how conditions recorded in connection with a component of the railway infrastructure, such as track segments or features, currently stand. A condition recorded against a component of the railway infrastructure indicates a deviation from the operational requirement of the component such that remedial action may be required. The remedial action may be of temporary nature to provide for safe operation or of more permanent nature, such as repairs of the component to resolve the condition.

More specifically, the dashboard 1900 shows whether overdue conditions 1922 exist, conditions that are currently due 1924 exist and also shows currently completed conditions 1926.

The work summary information 1908 shows to the user a collection of metrics about work assignments on the railway infrastructure. Specifically, the work summary information shows work assignments that are urgent 1928, near urgent 1930 and completed 1932.

The dashboard 1900 allows the user to access different functionalities and features of the system that provide additional information on the railway infrastructure or that can allow the user to record events and conditions arising in connection with the railway infrastructure. More specifically, the dashboard 1900 allows the user to invoke conditions management tools 1934, tools to log results of track inspections 1936 and also tools to log results of feature inspections 1938.

The tools to manage conditions 1934 include a tool to retrieve components 1942 in the database of components, a tool to create a component inventory report 1944, a tool 1946 allowing to modify a component of the railway infrastructure, such as a track segment or feature, a tool to record a condition 1948 in connection with a component of the railway infrastructure, a tool 1950 to view all outstanding conditions in connection with a certain component of the railway infrastructure and a tool 1952 to select maintenance activities in connection with a condition.

The tools 1936 to log results of track inspections include a track inspection summary tool 1954 providing details about track inspections and a tool 1956 to log the results of a track inspection.

The tools 1938 to log results of feature inspections include a feature inspection summary tool 1958 providing details about feature inspections and a tool 1960 to log the results of a feature inspection.

The dashboard 1900 allows the user to access any one of the tools indicated above. The arrows in the drawing show possible access paths to the individual tools, however those access paths are not exclusive in the sense that the tools may be invoked in other ways without departing from the spirit of the invention.

FIG. 3 is an example of an on-screen display of the dashboard 1900. The dashboard 1900 displays consolidated information to the user and also has a plurality of controls that allows the user to invoke a plurality of different tools for performing railway infrastructure management.

The information presented to the user consolidates track inspection status information 1902, feature inspection status information 1904, conditions summary information 1906 and work summary information 1908.

The track inspection status information 1902 is presented into a track status information area 322 which shows information about an inspection schedule of track segments. Note that the track segments include curves, sidings, spurs and yard track in addition to straight track segments used for regular traffic. The track inspection status information is presented as a table showing a subdivision 300 of the railway infrastructure for which track inspection status information is provided 302. The track inspection status 302 shows three distinct categories, namely overdue 304, due 306 and completed 308. The subdivision field 300 identifies a certain zone of the railway infrastructure containing the track segments for which inspection information is being provided. Typically, the railway infrastructure is divided into geographical zones that may have any appropriate surface and/or shape. The subdivision information refers to anyone of those geographical zones.

The overdue category 304 includes track segments on which an inspection is past due. The due category 306 shows track segments on which an inspection is currently due but it is not overdue, while the completed category 308 shows track segments on which an inspection is completed.

Specifically, the track status information area 322 shows that the subdivision 241 has 13 track segments on which inspection is overdue, one track segment on which inspection is due and 165 track segments on which the inspection has been completed. The track status information 1902 also shows that for the subdivision 270 there are no track segments for which inspection is overdue, no track segments for which the inspection is due and 78 track segments for which the inspection has been completed.

Moreover, the track status information area 322 shows current totals for the railway infrastructure territory on which reporting is being done. The territory can encompass the entire railway infrastructure or a portion thereof, such as a selected number of subdivisions, which as discussed earlier are smaller parcels of the territory. Therefore, the totals indicate that in the entire territory there are 13 track segments on which inspection is overdue, 1 track segment on which inspection is due and 243 track segments on which the inspection has been completed.

It will be appreciated that the track status information area 322 does not show the entire inventory of track segments that exist in the territory of interest, but are a filtered version of that inventory showing only the subdivisions with track segments relevant from an inspection point of view.

The track status information area 322 is provided with a control allowing the user to drill down and gain more information, about the track segments in any one of the overdue 304, the due 306 and the completed 308 categories. In a specific example of implementation, the control is in the form of a clickable text or graphic that when activated will take the user to a different page or open a new window on the screen to display the additional information. The control can be in the form of a hyperlink 310. The hyperlink 310 appears as an underlining of the number of track segments presented in anyone of the overdue 304, due 306 and completed 308 categories.

When a user activates the hyperlink 310, additional information is presented in a new window or page that identifies the track segments in the group associated with the hyperlink. The additional information may provide the identifiers of the track segments, a more specific geographical location of the track segments within the subdivision, such as the distance (from a suitable reference point) at which a track segment starts up to the distance at which a track segment ends or geographical coordinates, such as latitude and longitude of the beginning and/or end of a track segment, the date at which the inspection was due and the date at which the last inspection was made, among others.

Hyperlinks are associated with the track segment groups in the overdue 304, due 306 and completed 308 categories, for each subdivision, and for the overdue 304, due 306 and completed 308 categories in the totals row.

The feature inspection status information 1904 is structured in a somewhat similar fashion. The features in the territory of interest that are relevant from the inspection point of view are presented in term of categories in a feature status information area 324. Seven categories of features are provided namely, bridge, derail, joint and joint bar, lubricator, road crossing, track crossing and turnout. This is only an example and other categories can be used without departing from the spirit of the invention. For each feature category is provided inspection status information. That inspection status information is divided in overdue 314, due 316 and completed 318 categories. Totals 320 for each inspection category are shown as well.

The feature status information area 324 also contains a control allowing the user to obtain additional information about a group of features presented in the table. The control is a clickable text or graphic, such as a hyperlink 326 that when invoked, opens a new window or page showing the additional information. For example, invoking the hyperlink 326 in connection with the lubricators on which the inspection is overdue, the user is shown a window or page where those features are detailed. The additional information may provide the identifiers of the lubricators, a geographical location of the lubricators within the subdivision, such as the distance from a suitable reference point or geographical coordinates, such as latitude and longitude, the date at which the inspection was due and the date at which the last inspection was made, among others.

The conditions summary information 1906 is presented in a conditions summary area 328. The conditions summary area 328 presents conditions in connection with track segments or features of the railway infrastructure, ordered by severity of condition 330. A condition reflects the current state of a component of the railway infrastructure, such as a track segment or feature, and indicates a deviation from a correct operational state. A malfunction or defect noted in connection with a track segment or feature is an example of a condition that would be presented in the conditions summary area. Different condition severity categories 330 are being used, namely urgent conditions, near urgent conditions and priority conditions and a condition totals is also provided. Note that more or less condition severity categories can be used without departing from the spirit of the invention.

For each condition severity category, the status information 332 provided shows outstanding conditions 334 and completed conditions 336. The outstanding conditions 334 relate to conditions where a malfunction or defect currently exists while the completed conditions 336 relate to conditions where the malfunctions or defects have been remedied. The outstanding conditions 334 are separated into new conditions 338 and overdue conditions 340. Also a sum 342 of all conditions is shown. The completed conditions 336 are presented in terms of time of completion. In the example shown, two categories have been created, namely conditions completed yesterday 344 and conditions completed last week 346.

As in the case with the previously described track inspection status information 1902 and feature inspection status information 1904, the condition summary area 328 also contains a control allowing the user to obtain additional information about a group of conditions presented in the table. The control is a clickable text or graphic, such as a hyperlink 348 that when invoked, opens a new window or page showing the additional information. For example, invoking the hyperlink 348 in connection with the near urgent conditions that are overdue, the user is shown a window or page where those conditions are detailed. The additional information may provide the identification of the track segments or features to which the different conditions apply, the specific conditions that have been recorded in connection with the track segments or features, identifiers of the track segments or features, a geographical location of the track segment or features within the subdivision, such as the distance from a suitable reference point or geographical coordinates (such as latitude and longitude), the date at which the condition was recorded and any remedial action, among others.

The work summary information 1908 is shown in a work center summary area 350. The work center summary area 350 shows different tasks, whether they are outstanding and their degree of urgency. Typically, the tasks would be work necessary to remedy a condition shown in the condition summary area 328.

The work center column 352 shows a list of all tasks that have been recorded, in other words tasks that need to be carried out. The list includes tasks that have been assigned 354 to work crews and also tasks 356 that have not yet been assigned. The tasks presented in the work center column 352 are divided into an outstanding group 358 and a completed group 360. The outstanding group 358 relates to tasks that have not yet been completed.

The outstanding group 358 is divided in three categories in terms of degree of urgency of the task, namely urgent tasks 362, near urgent tasks 364 and priority tasks 366. The completed group 360 is divided between tasks completed yesterday 368 and tasks completed last week 370.

As in the case with the previously described track inspection status information 1902, feature inspection status information 1904 and the condition summary information 1906, the work summary area 350 also contains a control allowing the user to obtain additional information about a group of tasks presented in the table. The control is a clickable text or graphic, such as a hyperlink 372 that, when invoked, opens a new window or page showing the additional information. For example, by invoking the hyperlink 372 in connection with unassigned urgent tasks that are outstanding, the user is shown a window or page where those tasks are detailed. The additional information may provide the identification of the track segments or features to which the task relates, the specific conditions that have been recorded in connection with the track segments or features and to which the task will remedy, identifiers of the track segments or features, a geographical location of the track segment or features within the subdivision, such as the distance from a suitable reference point or geographical coordinates, such as latitude and longitude and the date at which the condition was recorded, among others.

Accordingly, the four information areas 302, 324, 332 and 350 provide the user with information regarding inspection of track segments and features, recorded conditions and tasks and work assignments in the relevant territory of railway infrastructure. The user can see at a glance what is overdue or that will shortly become overdue, which allows managing the inspections and repairs much more efficiently.

Note that while the example of an on-screen display at FIG. 3 shows the four classes or categories of summary information, more or less classes or categories can be used without departing from the spirit of the invention.

The on-screen display shown in FIG. 3 also shows a set of controls 374 allowing the user to invoke certain functions. The controls are clickable controls, in other words they can be operated by a pointing device. The controls are virtual buttons and they simulate mechanical buttons, but other controls can also be used without departing from the spirit of the invention.

Figure 4:
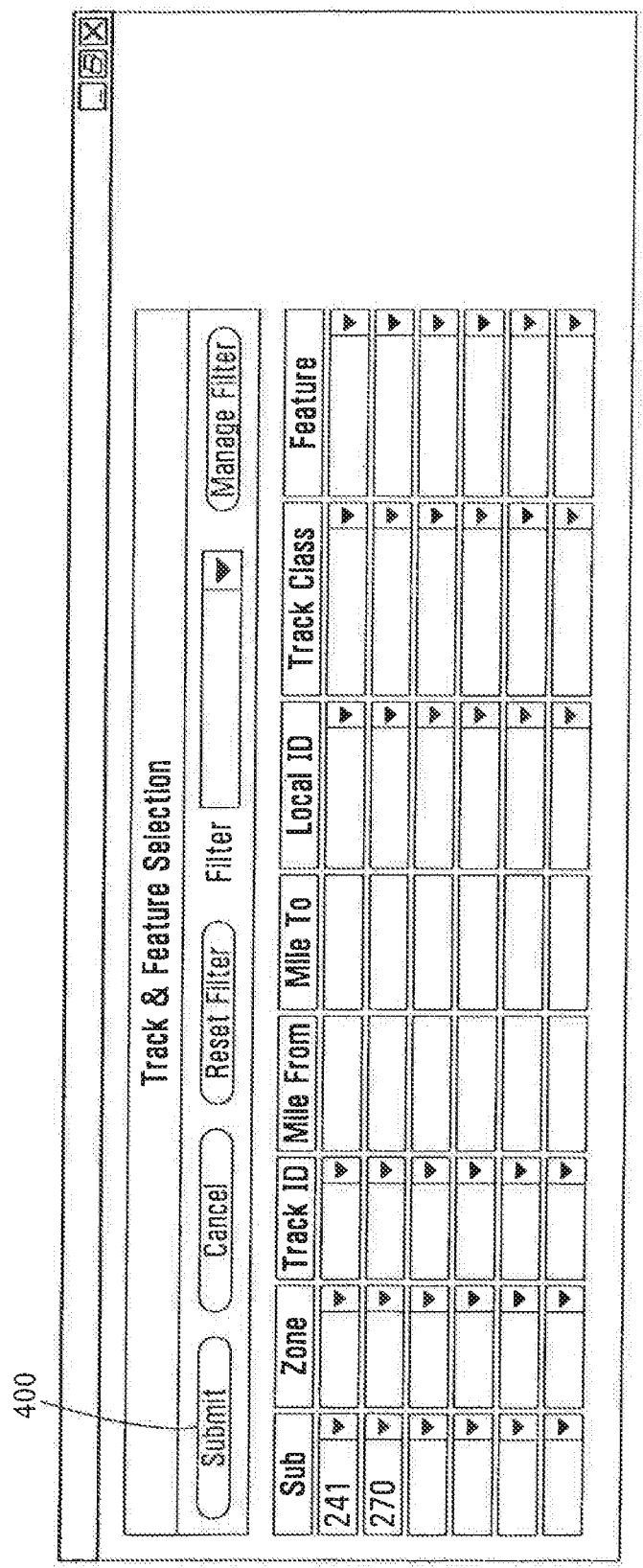
FIG. 4 is a diagram and example of an on-screen display allowing the user to perform a query in the railway infrastructure inventory database.

A plant inventory control 376 can be used to access the entire database of railway infrastructure components, namely track segments and features. By invoking the plant inventory control 376, the user invokes a filtering tool allowing entering filtering criteria in order to isolate a single component or a group of components of the railway infrastructure on the basis of certain characteristics. An on-screen display of the filtering tool is shown in FIG. 4.

The user can enter any desired selection criteria and invoke the component retrieval logic function 1942 (see FIG. 18) by clicking the submit button 400. As a result of this action, the database of railway infrastructure components will be filtered to extract only those entries that match the selection criteria. If no selection criteria are entered and all the fields are left blank, then the entire database of railway infrastructure components will be shown to the user.

The results of a filtering operation are shown in FIG. 5. In the block diagram of FIG. 18, those results correspond to the component inventory report function 1944.

The on-screen display has two information areas 500 and 502. The information area 500 shows track segment information while the information area 502 shows feature-related information. In other words, the set of track segments that have been generated by the filtering operation are listed in the information area 500 while the set of features produced by the filtering operation are listed in the information area 502.

The information area 500 has an information display field 506. The information display field 506 presents in a list format the set of track segments generated by the filtering operation. More specifically, the information display field 506 organizes the set of track segments according to the following:

1. An Object 508 shows the type of track segment, among several possible track segments, such as track and curve, among others.
2. A Zone 510 and Subdivision (Sub) 512 identify the geographical location of the track segment.
3. A Track (Trk) 514 and a Local ID 516 are track segment identifiers.
4. A Mile From (MF) 518 and a Mile To (MT) 520 show the beginning and end of the track segment relative to a reference point.
5. A Joint MP 522 shows a joint mile point.
6. A Track class 524 refers to the class of the track segment.

The information area 502 is structured in general similarly to the information area 500. There is provided an information display field 528. The information display field 528 presents, in a list format, the set of features generated by the filtering operation. More specifically, the information display field 528 organizes the set of features according to the following:

1. A Switch Throw (Sw Thr) 530, which refers to a cycling of a railroad switch.
2. An inspection status (Stat) 532 of the feature. The status information is shown by using color codes to facilitate the visual identification of features in the list that have a particular condition. The color coding arrangement uses four different colors to convey status information. When the color is white, this means that no outstanding action is required from the point of view of inspection. When the color is red, the inspection is overdue. When the color is yellow, the inspection is currently due and when the color is green the inspection has been completed. This color notification arrangement is shown to the user by using a format that suggests a traffic light which has a meaning widely understood.

3. An Inspection form 534. This is a clickable control 535 which, when actuated, invokes a function to record an inspection operation (the record a condition function 1948 in FIG. 18). Accordingly, a user performs an inspection operation on anyone of the features listed in the information display field 528 by "clicking" in the associated control 535.
4. An Object 536 provides a description of the feature.
5. A Zone 538 and a Subdivision 540 (Sub) identify the geographical location of the feature.
6. A Track (Trk) 542 and Local ID 544 are feature identifiers.
7. A Mileage position (MP) 546 is the distance of the feature from a reference point.
8. A Frequency (Freq) 548 refers to the frequency at which an inspection is to be performed. For example, a turnout and a lubricator would typically have a monthly inspection frequency. Obviously these are examples and the inspection frequency can greatly vary from one feature to the other.
9. A Last Inspection (Last Insp) 550 shows the date at which the last inspection was made.
10. A Last Throw 552 shows the date at which the last throw was made.
11. A Last Annual 554 is the date at which the last annual inspection is performed.

The information areas 500 and 502 have selection fields 504 and 526, respectively allowing the user to perform a selection on anyone of the entries listed in the respective information display fields 506 and 528. The selection is performed by placing a check mark in anyone of the check boxes of the selection fields 504 and 526. Once a selection is made the user can invoke one or more tools on the selection. The tools can be invoked by a set of actuating controls appearing on top of the information areas 500 and 502. The controls associated with the information area 500 appear as a row 556 of virtual buttons that are clickable. Similarly, the controls associated with the information area 502 appear as a row 558 of virtual clickable buttons.

The row 556 includes the following controls:

1. Modify component 560 corresponds to the Modify Track/Feature function 1946 in FIG. 18 and is used to modify details about a track segment in the database. When this control is activated the user is shown a dialog box or page rendering the on-screen display shown in FIG. 6. The on-screen display 600 includes a plurality of fields containing information about the selected track segment. The user can enter relevant changes in the desired fields and select a submit control 602 in order to record those changes in the database 14.
2. Record condition 562 corresponds to the Record a Condition function 1948 in FIG. 18 and is used to record a condition. When this control is activated the user is shown the dialog box or page rendering an on-screen display 700 shown in FIG. 7. The information presented identifies the track segment selected at the display shown in FIG. 5 and for which a condition is to be recorded. Note that the on-screen display 700 has information fields identifying the track segment that are already populated. Otherwise, the user is required to enter sufficient information in order to uniquely identify the track segment. Accordingly, when user invokes the record condition function 562 and a track segment has been selected, the track segment identification fields will be populated already and all is required is to confirm that indeed this is the track segment against which a condition is to be recorded. However, note that the user can enter information about a particular mile point 704 at which the condition exists. This field cannot be populated automatically and requires input by the user.

On the other hand, if no track segment selection has been made in the on-screen display of FIG. and the record condition function 562 is invoked, the information fields will be blank. The user is required to enter the necessary information and then click the submit control 702 to proceed.

When the submit control 702 is activated the user is shown an information screen 900 shown in FIG. 9. The system will perform a search of the database of existing conditions to extract the currently outstanding conditions recorded against the track segment. Thus the user sees at the screen 900 the list of all the current outstanding conditions which allows verifying that the condition that is to be entered is a new one. The information screen 900 therefore reduces the possibility of creating duplicate entries.

Figure 8:
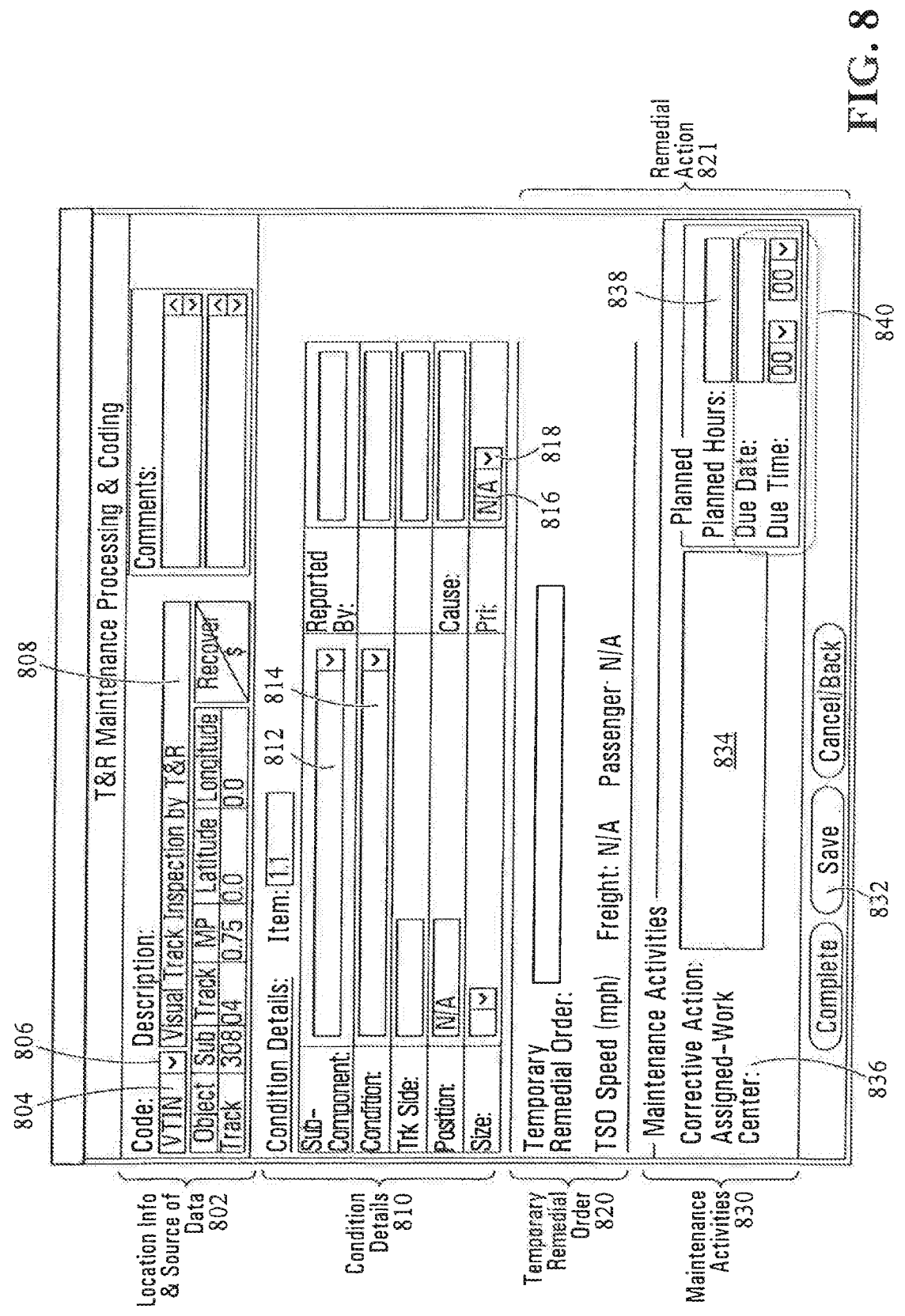

If the condition to be recorded is not in the list shown in the information screen 900 and it is, therefore a new condition, the user activates the submit control 902 by clicking on it which opens an information screen 800 that is shown in FIG. 8. The information screen 800 has four different sections, namely:

A Location information and source of data section 802. This section identifies the location of the track segment against which the condition is to be recorded. Note that if the track segment was pre-selected as per FIG. 5, then the location information will be provided already, except perhaps the mile point (MP) information which is case specific and requires input from the user. The user can change the code information 804 by using a drop-down menu 806. A description field 808 describes the source of info used to create the condition. It has a default information source (which is inspection of the track segment) however, that default information source can be changed.

Figure 30:
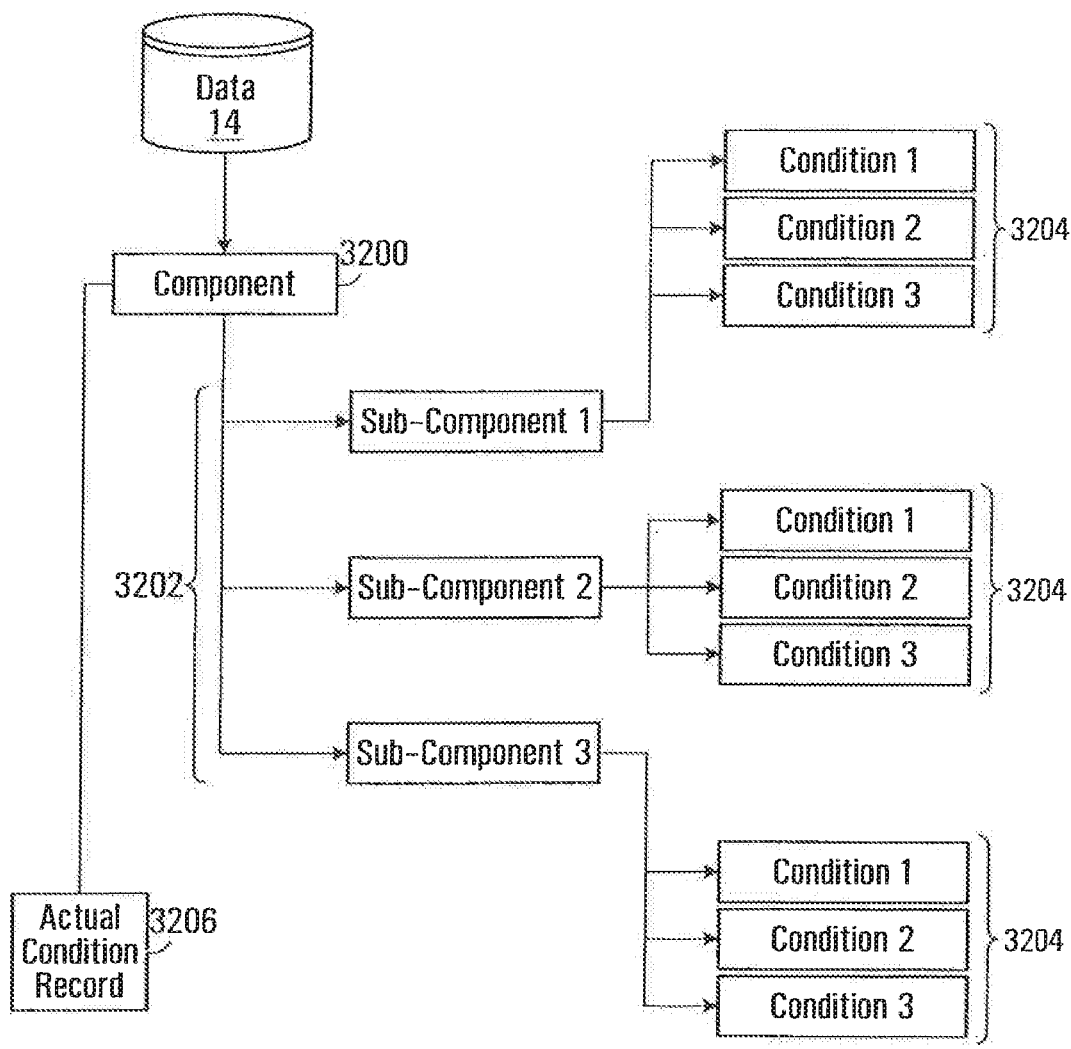
FIG. 30 is a block diagram that illustrates the manner in which the data representing the railway infrastructure inventory is structured.

A Condition details section 810. This section identifies the track segment and the condition to be recorded. A sub-component field 812 presents to the user a number of pre-selected options to select from. This can be better understood with reference to FIG. 30 that illustrates the manner in which the data representing the railway infrastructure inventory is structured.

As discussed previously, the railway infrastructure includes a collection of components, where each component can be a track segment or a feature, for example. The components exist in the database 14 as data entities, such as records 3200, where each record is associated with a unique component. A component 3200 is identified in a number of possible ways to make it distinguishable from other components stored in the database 14. For instance, the component 3200 can be identified by its location, such as geographic coordinates, its particular type (track, feature or other) or any suitable characteristic. Each component 3200 is further associated in the database 14 with a number of possible sub-components 3202. The sub-components 3202 are constituent parts of the component 3200. For example, a track segment, which constitutes a component 3200 in the database 14, would have sub-components such as crossties, tie plates, rail anchors, derails and rail fasteners, among others. Note that the sub-components 3202 could be the same for components 3200 of the same type or different.

Note that the number of sub-components 3202 per component 3200 in the database 14 can vary without departing from the spirit of the invention. More or less sub-components 3202 can be provided depending on the desired degree of data structure granularity.

Further, the data structure associates each sub-component 3202 to a number of possible conditions 3204 that may be observed during the operational life of the sub-component 3202. For example, in the case of a crosstie, the following are possible conditions 3204:

1. The crosstie is broken;
2. The crosstie is cracked;
3. The crosstie is loose;
4. Fasteners on the crosstie are missing;
5. The crosstie is not properly aligned with the rail;
6. The crosstie is eroded.

The data structure therefore provides a representation of the railway infrastructure on a component-by-component basis, whereby each component is broken down into its sub-components and also of the various conditions that may be observed in connection with the sub-component. Note that the data structure also contains additional information in connection with the various conditions, which will be discussed later.

Referring back to FIG. 8, a condition field 814 provides selection options allowing the user to pick a condition, from a set of possible conditions. The set of conditions presented to the user from which a selection can be made is determined on the basis of the component information presented. In other words, the user has a finite number of choices to describe the condition. In this fashion, a high degree of consistency is achieved and the variability that would arise if an operator is left with all the freedom to describe the condition in his or her own words is removed. The sub-component field 812 is a drop-down menu box that allows the user to select the sub-component of the track segment against which the condition is to be recorded. The field 812 presents to the user only the sub-components associated with the component (e.g. track segment) selected earlier. In other words the user only sees in the selection list the sub-component(s) 3202 that are relevant. The selection of the sub-components 3202 that appear in the drop down box for the sub-component field 812 is made by querying the database 14 once the component (track segment, in this case) has been selected.

A similar approach is used to provide condition information for the condition field 814. The condition field is also a drop-down menu box linked to the database 14 which presents for selection only the conditions 3204 associated with the sub-component 3202. Once the user has made a selection of the sub-component 3202, only the conditions 3204 associated with that sub-component will be available to the user.

Accordingly, the set of conditions presented to the user in the condition field 814 from which a selection can be made dynamically changes depending on the component that is entered in the sub-component field 812. In a possible variant the user may be allowed, in addition to the predefined set of conditions, to also enter additional information on the condition. This additional information may be entered in a separate field, for example.

The priority information within a priority field 816 may be automatically determined on the basis of the condition information. In other words, each condition is associated with a priority level and does not require an input from the operator. This can be implemented by associating in the database 14 priority information for each condition 3204, as it will be discussed below in connection with FIG. 19. Another possibility is to force an entry in the priority field 816 only under certain circumstances, such as when the condition is deemed urgent. When the condition is such that it is not urgent, then the operator is left with the option to set the degree of urgency by using the drop-down menu control 818.

Figure 19:
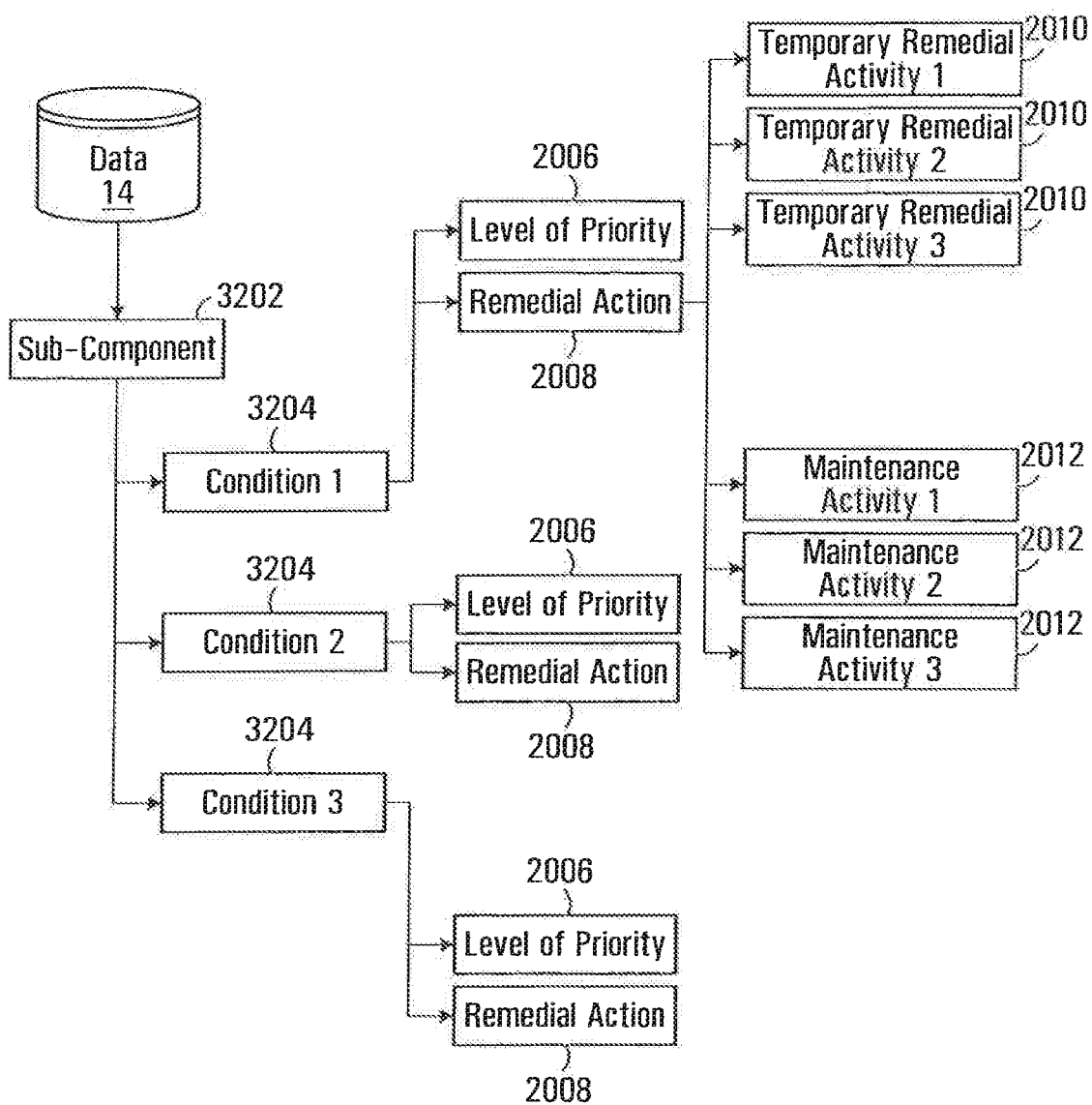
FIG. 19 is a block diagram illustrating a data structure linking features, conditions, level of priority and remedial action information.
Figure 20:
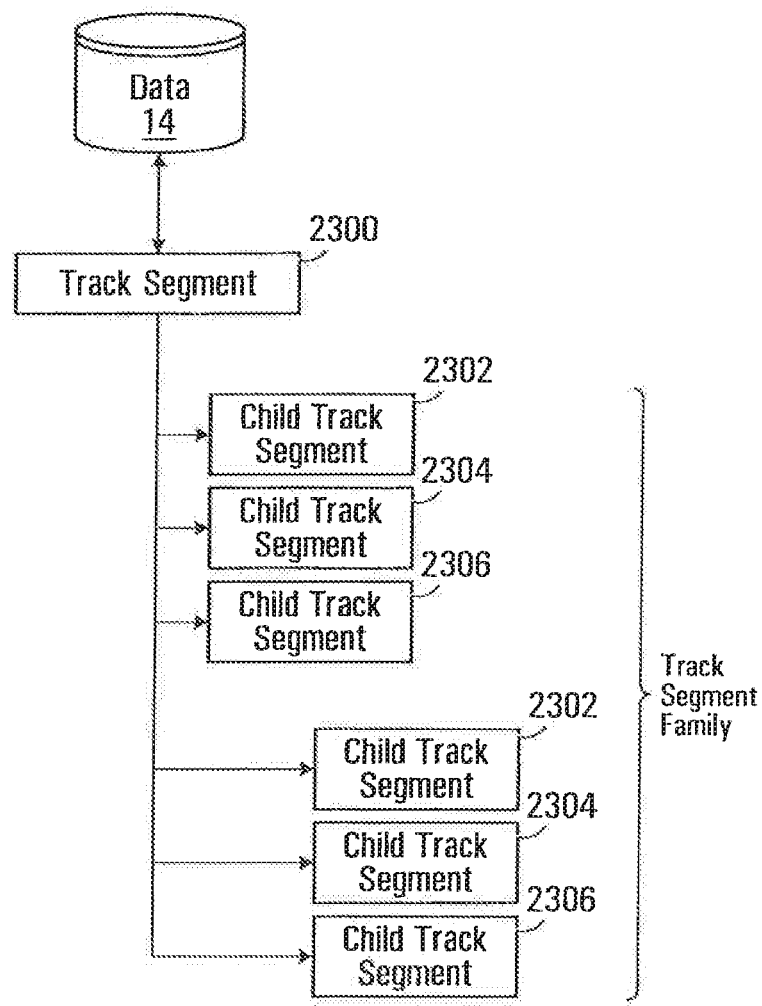
FIG. 20 is a block diagram illustrating a data structure for linking various track segments, some of them interconnected and constituting a track segment family.

FIG. 19 is a block diagram that further details the information stored in the database in connection with the various conditions that may be observed by the user. This figure shows that the database 14 associates each one of the conditions 3204 with a level of priority 2006, as well as with a remedial action 2008. While this figure shows a single remedial action per condition, more than one action can be provided from which the user can choose.

A remedial action is an action to be implemented to remedy the condition recorded against the sub-component. A specific example of a remedial action is a so-called "Temporary Slow Order" (TSO) that requires trains passing on the track segment with the recorded condition to obey a speed limit. The TSO is not necessarily the same for each type of train. For instance, for freight trains that are usually heavier, the speed restriction may be more important than in the case of passenger trains.

The remedial action may be of a permanent nature, such as a long-term resolution of the condition or of a temporary nature such as the change of operational procedures for safety purposes. Typically, a long-term resolution would imply a maintenance activity repair to fix the condition. In the case where the resolution is of temporary nature, the measures implemented include a temporary remedial order that aim to insure the safety of the continued operation of the track segment while permanent repairs are done. This resolution (as per the example given above) can be a TSO, or any other suitable measure to reduce the risk of accidents while the condition is outstanding. Note that a temporary remedial order does not always allow for a continued operation of the track segment. Situations exist where a temporary remedial order may include the closure of the track segment for a time period sufficient to allow a maintenance activity to be carried out.

Accordingly, the remedial action record 2008 may prescribe more than one type of activity in order to resolve the condition. There may be a first activity (temporary remedial order) to provide a fix of a temporary nature, such as a TSO, to be followed by a second activity (maintenance activity), to permanently fix the condition. This may include repairs of faulty parts or the entire replacement of the track segment with a new one.

As FIG. 19 shows, a remedial action record 2008 can be associated with several possible remedial activities of temporary nature 2010 and also with several possible maintenance activities 2012.

The remedial action information appears in the remedial action section 821. This section shows both the temporary remedial activity and the maintenance operation that is to be implemented in accordance with the condition that is recorded, as selected by the operator. As indicated earlier, both the temporary remedial activity and the maintenance activity can be determined automatically by the system on the basis of the association between the condition 3202 and the predetermined remedial action records 2010 and 2012 in the database 14. In the case when several temporary remedial activities and maintenance activities are possible the section 820 can be provided with a drop-down menu box, from which the user can view the possible options presented as a list and pick the one that is the most suitable.

A maintenance activities information area 834 shows the maintenance activities information. The maintenance activities information can be predetermined on the basis of the condition selection and derived from the remedial action record 2008. In such a case, the maintenance activity information is automatically entered in the maintenance activities information area 834, or if a plurality of possible maintenance activity operations is possible, the user is provided with a list of the options to select from. Optionally, the maintenance activities information can be specified entirely by the operator. A maintenance activity information area 834 includes also a field 836 specifying the work center to which the corrective action has been assigned, a field 838 specifying the number of hours the corrective action should take and a set of fields 840 specifying a due date and due time to carry out the corrective action.

When all the information has been entered by the user in the on-screen display shown in FIG. 8, the user can save the information by clicking on the control 832. The information entered is then stored in the database 14 into an actual condition record 3206, shown in FIG. 30. The actual condition record 3206 is to be distinguished from the condition records 3204 with merely list possible conditions while the actual condition record refers to a current condition and contains information about the particular condition encountered, priority and remedial actions, among others.

Figure 11:
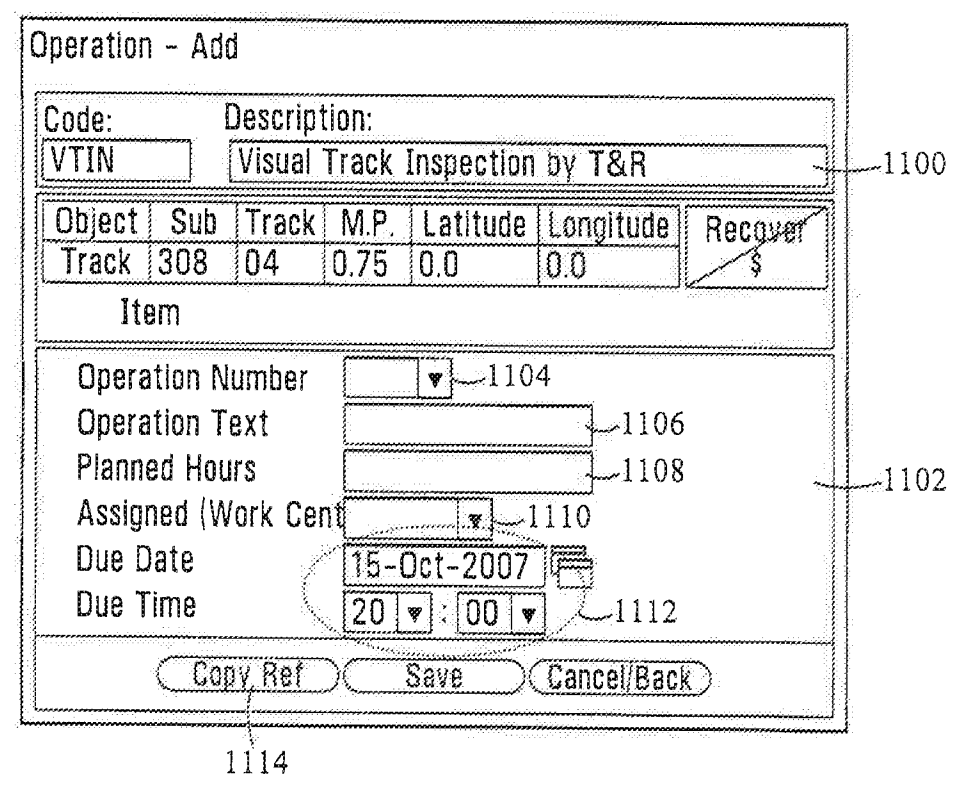

Using the save control 832 shows the on-screen display shown in FIG. 10, which shows an information area 1000 that summarizes the condition associated with the track segment and the temporary remedial activity, in any. The information area 1000 includes a section 1001 where various maintenance activities recorded in connection with a condition or track segment are listed and a set of controls 1002 that allow the user to manage the maintenance activities presented in the section 1001. More specifically the set of controls 1002 includes a control 1004 to allow adding maintenance activities, a control 1006 to allow the changing of a recorded maintenance activity, a control 1008 to allow deleting a maintenance activity and a control 1010 to allow marking a maintenance activity as being completed. If a maintenance activity is to be added to the section 1001, the control 1004 is activated and this displays the dialog box or page shown in FIG. 11. With respect to this figure, the on-screen display identifies at 1100 the track segment on which the maintenance activity is to be performed and also identifies at 1102 the operation to be performed. The operation to be performed 1102 includes details such as an operation number 1104 (used if a number of operations are to be performed), specifics of the operation 1106, an indication of the number of hours the operation is to take 1108, an assigned work center 1110 and a due date and time 1112 at which the operation is to be completed. The section 1102 is structured similarly to the section 830 shown in FIG. 8. From a practical point of view, the section 1102 can be used to enter a maintenance activity, other that the one specified in section 830, such as a maintenance activity that is not related to a particular condition. An example of a maintenance activity that is not related to a condition is preventive maintenance where no malfunction exists that is to be corrected.

Figure 12:
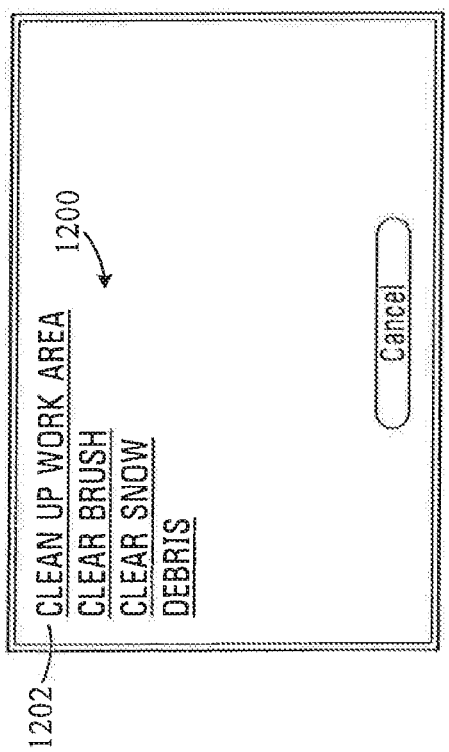
FIG. 12 is a diagram and example of an on-screen display providing a list of common maintenance activities from which the user can select an activity to be performed.

A control 1114 can be invoked to bring in the dialog box or page shown in FIG. 12. The dialog box or page shown in this figure presents a list of predetermined maintenance activities 1200 that are commonly performed and from which the user can make a selection that would avoid him/her having to enter the details manually in the section 1102. These maintenance activities are typically not related to a particular condition. The list of maintenance activities 1200 includes a set of items where each item is associated with a maintenance activity. Each item includes a control 1202, in the form of a hyperlink. The hyperlink is activated when the user clicks on it, which has the effect of populating the section 1102 with the relevant information associated with that maintenance activity.

Referring back to FIG. 5, the process for recording a condition in connection with a feature and modifying or creating a feature in the database 14 is similar to those processes described in connection with track segments. More specifically, the information area 502 has a group of controls 558, in the form of virtual clickable buttons that can be actuated to invoke the functions. Once those functions have been invoked, the process through which the information is entered to create the conditions and remedial actions associated with a condition of a feature or sub-components of a feature is very similar to the process described earlier and for that reason the explanation need not be repeated.

Referring back to FIG. 3, in particular to the set of controls 374, these controls include a subset of controls 378 for invoking functionalities to log the results of track inspections. The subset of controls 378 is in the form of clickable virtual buttons, including a control 380 to log the results of a new track inspection, a control 382 to resume the logging of an inspection that was previously initiated but not completed and a control 384 to generate a summary.

Figure 14:
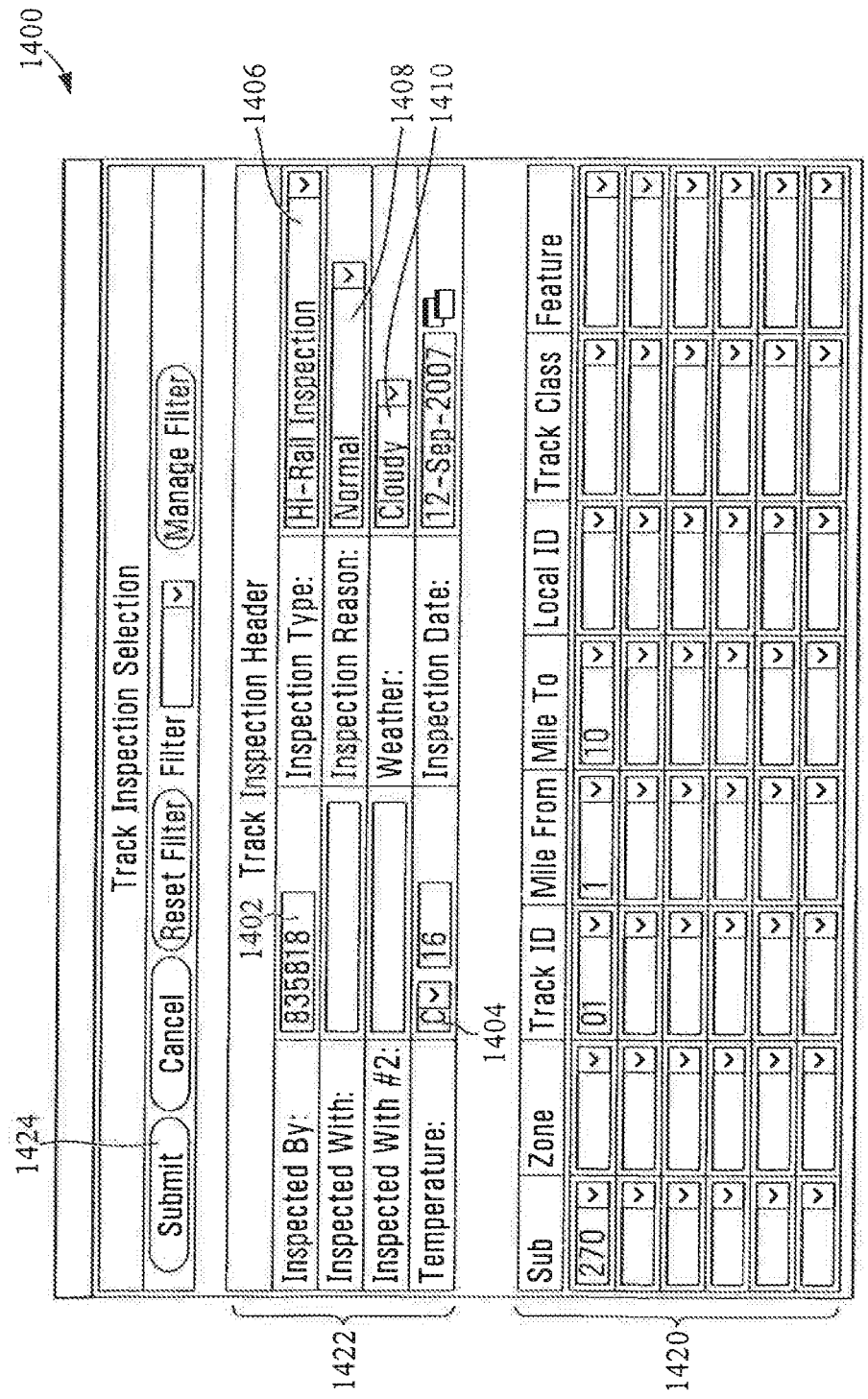
FIG. 14 is a diagram and example of an on-screen display showing a track inspection selection screen.

When the control 380 associated with the logging of a new track inspection is activated an on-screen display 1400 shown in FIG. 14 is displayed to the user.

The on-screen display 1400 provides an information area allowing the user to specify the general area that will be inspected and provide information about the type of inspection that will be performed, current weather and identity of the inspector and the inspection date. The general area that is to be inspected in specified in information area 1420. In this area, the user can specify the Subdivision, the Zone, the Track ID the Mile From, the Mile to, the Local ID, the Track Class and Feature information, among possible others. In this particular example, the track segment from Mile 1.0 to Mile 10.0, of track 01 in the Subdivision 270 is specified.

Another information area 1422 displays other inspection details, such as an identifier for the inspector 1402, an observed temperature during the inspection 1404, an inspection type 1406, a reason for the inspection 1408 and weather conditions observed during the inspection 1410, among others. The inspection type 1406, the inspection reason 1408 and the weather 1410 include controls in the form of drop-down menu boxes that present the user with a predetermined list of choices from which the user can make a selection.

When all the information is entered, the user, by clicking on the control 1424 invokes the on-screen display 1300. In other words, the control 1424 will cause the software to search the database 14 and to extract additional information about the track(s) and features in the general area of the railway infrastructure specified in the information area 1400, which in the current example is the track segment from Mile 1.0 to Mile 10.0, of track 01 in the Subdivision 270.

Figure 13:
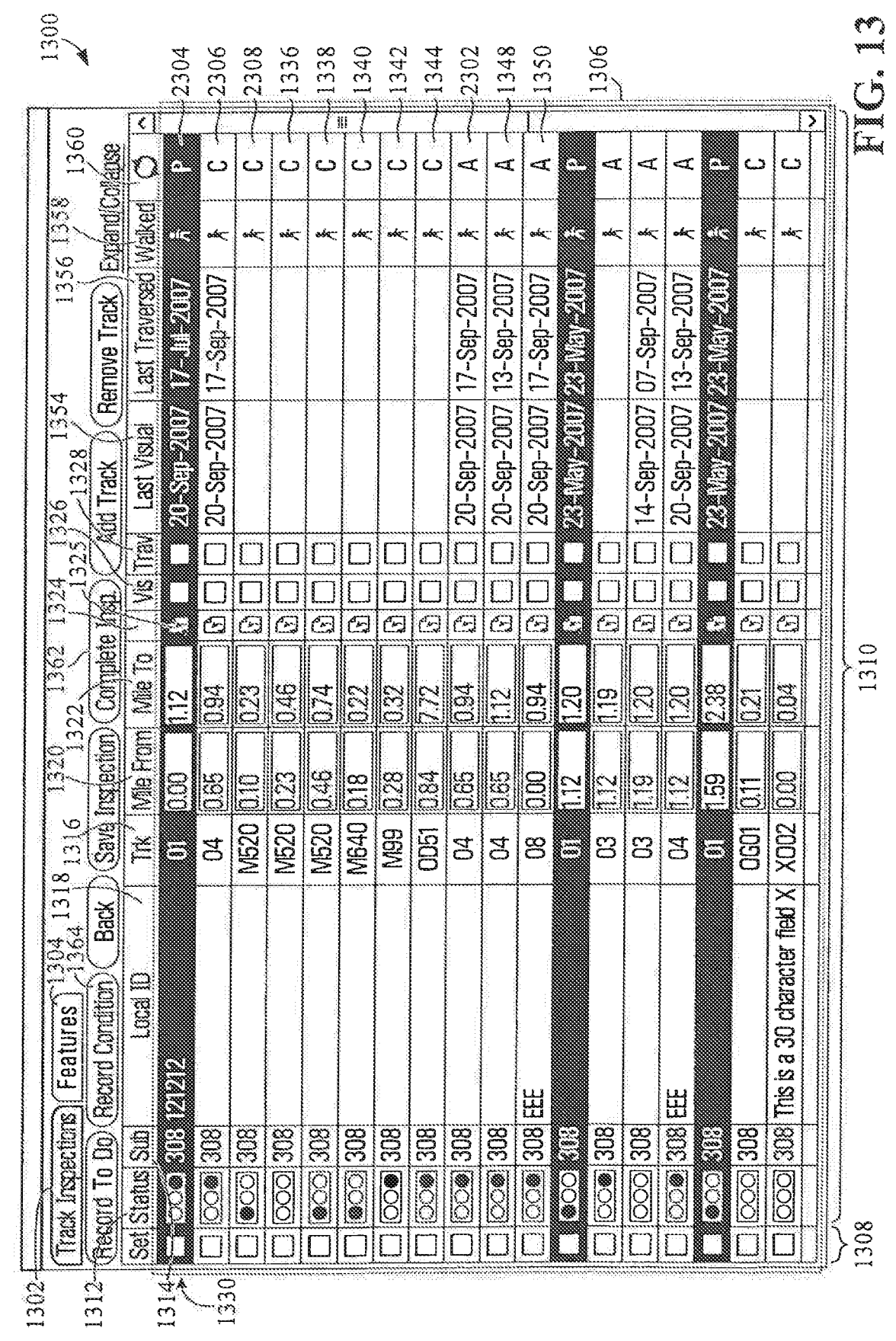

FIG. 13 shows an on-screen display 1300 that combines both information areas for logging inspections in connection with tracks and features in the of the railway infrastructure specified in the information area 1400. The respective information areas can be accessed via their respective controls 1302 and 1304, which are in the form of clickable tabs.

With specific reference to the information area 1306 associated with the tab 1302 in connection with track inspections, that information area presents a plurality of records in a list format. Each record is associated with a track segment that can be inspected. The information area 1306 has a selection field 1308 and an information display field 1310. More specifically, the information display field 1310 organizes the set of track segments according to the following:

1. An Inspection status indicator 1312 that provides a visual indicator of the inspection status. The status information is shown by using color codes. The color coding arrangement uses four different colors: when the color of the indicator is white, this means that no outstanding action is required from the point of view of inspection. When the color of the indicator is red, the inspection is overdue. When the color of the indicator is yellow, the inspection is currently due and when the color of the indicator is green the inspection has been completed.
2. A Subdivision (Sub) 1314 that identifies the geographical location of the track segment.
3. A Track (Trk) 1316 and a Local ID 1318 that are track segment identifiers.
4. A Mile From (MF) 1320 and Mile To (MT) 1322 that show the beginning and end of the track segment relative to a reference point.
5. A column 1324 that provides for each record a clickable control 1325 that will refresh the display. This is useful in instances where the Mile From (MF) 1320 and/or Mile To (MT) 1322 values have been changed by the person performing logging the results on an inspection. This situation may arise when a track segment is being inspected partially and the results of that inspection are logged. By specifying in the Mile From (MF) 1320 and/or Mile To (MT) 1322 fields the portion of the track segment that was inspected, the record will accurately reflect the inspection operation.

Figure 31:
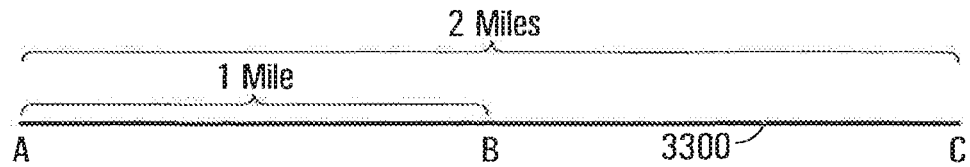
FIG. 31 is schematic view of a track segment showing an inspected portion of the track segment and a non-inspected portion.

FIG. 31 provides an example of an inspection process where only a portion of a track segment is inspected. FIG. 31 shows a track segment 3300 that is to be inspected. The inspection can be a visual inspection or can be made by traversing the track segment. Assume that the track segment has a length of AC which corresponds to a distance of 2 miles. Before the inspection results are logged, the track segment could be shown as a single line in the information area 1306, where the Mile From 1320 and the Mile To 1322 fields may indicate 0.00 and 2.0 respectively.

When the user performs the inspection process, he/she is not able to complete the inspection of the track segment completely. The inspection is made only on a portion of the segment, from point A to point B. Point B is located at one mile from point A, hence only 1 mile of the track segment 3300 has been inspected and 1 mile remains to be inspected.

In this situation, the user will modify the Mile From 1320 and the Mile To 1322 fields by entering the length of the inspected portion only of the track segment 3300, in this case 0.00 and 1.0, respectively.

By pressing the clickable control 1325, the system will refresh the display to account for the inspected portion of the track segment and also for the non-inspected portion. This would appear in the information area 1306 as a new line, immediately below the existing line associated with the non-inspected portion of the track segment. The line would contain the same data as the previous line in the subdivision field 1314, the local ID field 1318 and the track field 1316. The Mile From 1324 and the Mile To 1322 fields will change to reflect only the non-inspected part. Specifically, the Mile From 1324 and the Mile To 1322 fields would show 1.0 to 2.0.

It is important to note that the newly created entry in the display 1300 has status information that would likely be different from the status information of the originating entry. Since the originating entry refers now only to the inspected portion of the track segment 3300, is status field 1312 would reflect this, and should be showing a green light. In contrast, the status field 1312 of the newly created entry would show that this portion of the track 3300 is not inspected by showing a yellow or a red indicator.

Figure 32:
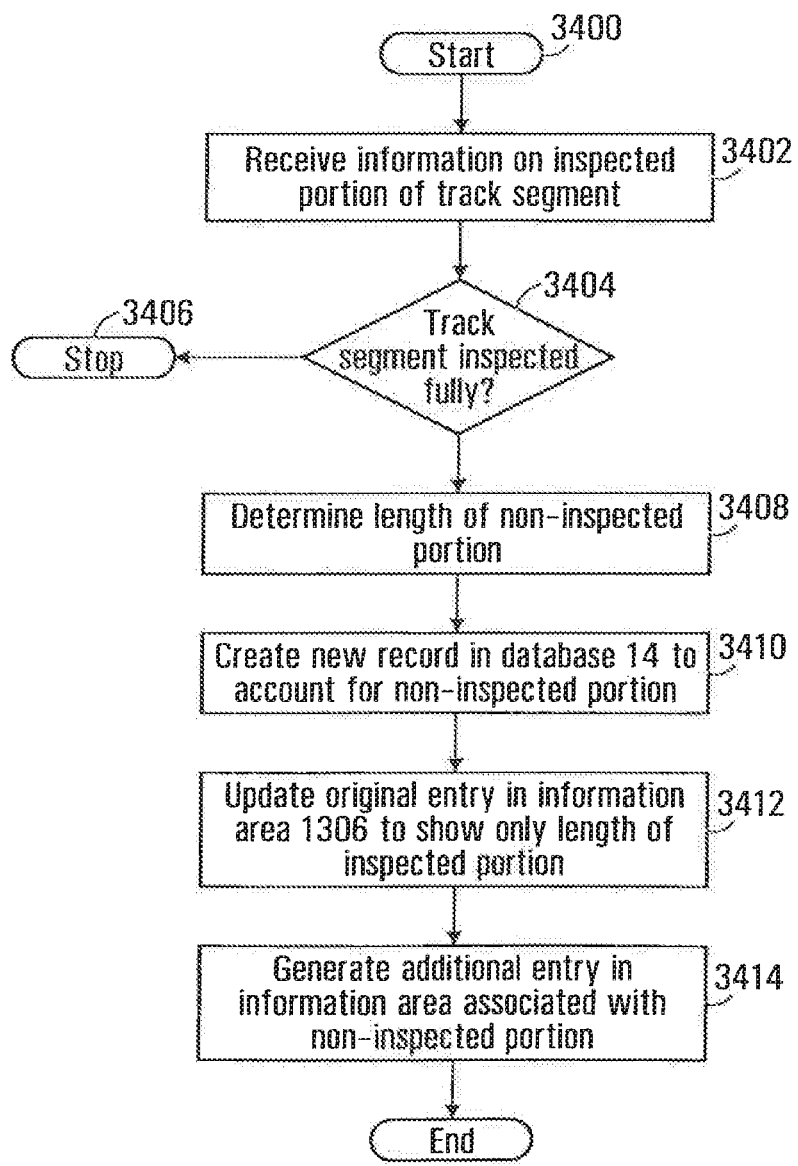
FIG. 32 is a flow chart illustrating the process for modifying the database and the display in order to account for non-inspected portions of a track segment.

FIG. 32 is a block diagram that illustrates the program logic used to implement this functionality. The processing shown starts at step 3400. At step 3402 the software receives information on the inspected portion of the track segment. This step could corresponding to the entry by the user of the Mile From 1320 and the Mile To 1322 fields in the information area 1306 and the activation of the control 1325.

At step 3404 (which is a decision step), the software determines if the entire track segment has been inspected. This is done by comparing the information in the Mile From 1320 and the Mile To 1322 fields entered by the user to the entire length of the track segment. The presence of a match would indicate that the entire segment has been inspected, while the absence of a match would indicate a partial inspection. If the track segment has been completely inspected the process stops, as shown by step 3406. Otherwise, the process continues in step 3408 where the program first determines the length of the non-inspected portion and also the position of the non-inspected portion. With respect to the example and to FIG. 31, the inspected portion is the first half of the track segment AC while the last half CB is not inspected. This can be done if a number of possible ways, one being to subtract the length of the inspected part from the total length of the track segment 3300 to find the length of the non-inspected portion and by observing the manner in which the Mile From 1320 and the Mile To 1322 information is entered by the user to determine the location of the non-inspected segment within the track segment 3300.

At step 3410 a new record is created in the database 14 to account for the non-inspected portion. The new record is essentially a copy of the original record associated with the track segment, with at least two significant distinctions. One distinction resides in the Mile From field 1320 and the Mile To field 1322 information, as discussed earlier. The other distinction is the inspection status information, which for the new record is likely to reflect a non-inspected status, which is reflected in step 3414. The step 3410 also has the effect of modifying the original record to adjust the Mile From 1320 and the Mile To 1322 information such that the original record only now reflects the inspected portion, which is reflected in step 3412. Note that the use of the term "record" is used here only in the conceptual sense and does not dictate any particular implementation at the software level. In fact, it is possible to perform those operations by using a single data structure element in the database 14 association with the track segment 3300, that is associated with a number of possible descriptors, such as a descriptor for the inspection status, a descriptor for the Mile From 1320 and the Mile To 1322 information, etc. The above discussed operations can be performed by adding or modifying descriptors, within the context of a common data structure element.

6. A Visual (Vis) checkbox 1326 that is checked when the inspection of the track segment is done visually.
7. A Traversed (Trav) checkbox 1328 is checked when the inspection of the track segment is traversed with an inspection device. The inspection device can be a hand-held setup that is manually pushed over the track segment or can be an inspection car. The inspection car can be towed over the track segment by a locomotive. Alternatively, the inspection car can include a road-rail vehicle which is a self propelled vehicle that can be used both on roads and rails, which are commonly referred to as "HiRail" vehicles. The inspection device, such as the hand-held setup or the inspection vehicle may include a probe or transducer that probes the track segment to identify flaws. Examples of detection methods include:
   a. Ultrasonic testing;
   b. Induction testing.

Figure 21:
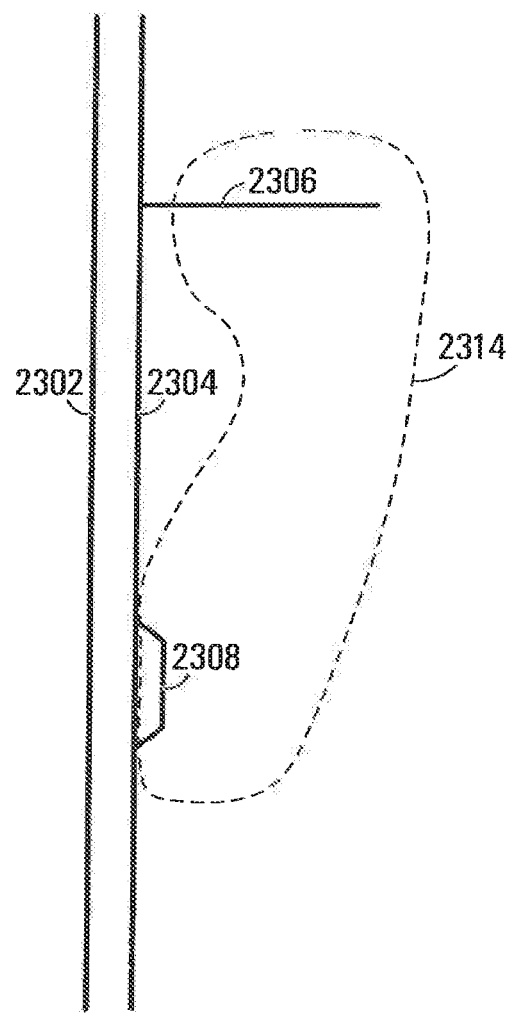
FIG. 21 is a diagram illustrating a set of railway tracks that include adjacent tracks and interconnected track segments, such as spur lines.

When the Tray (Traversed) checkbox 1328 is checked, which in this case constitutes a clickable control, this operation will invoke a query in the database 14 to identify all the track segments that are geographically proximate to the track segment that was traversed. Geographically proximate track segments may include tracks that are connected to the traversed track segment but also tracks that are physically close but that are not connected. An example of tracks that are physically close but not connected are parallel tracks. This is best shown in FIG. 21. A portion of the railway infrastructure 2300 has a plurality of track segments, namely two rectilinear track segments 2302 and 2304, and a spur track segment 2306 that connects to the track segment 2304. Also, the track segment has a siding 2308. The geographical layout of those track segments is such that the rectilinear track segments 2306 and 2308 form a group 2314 of track segments that are physically close to one another.

The arrangement of the track segments into groups is an arrangement that is done largely on the basis of how the track segments interconnect with one another. In the example shown, the track segment 2304 is considered to be a parent track while track segments 2306 and 2308 are considered as child track segments. The track segment 2302, on the other hand, is an adjacent track segment to the parent track 2304.

Figure 22:
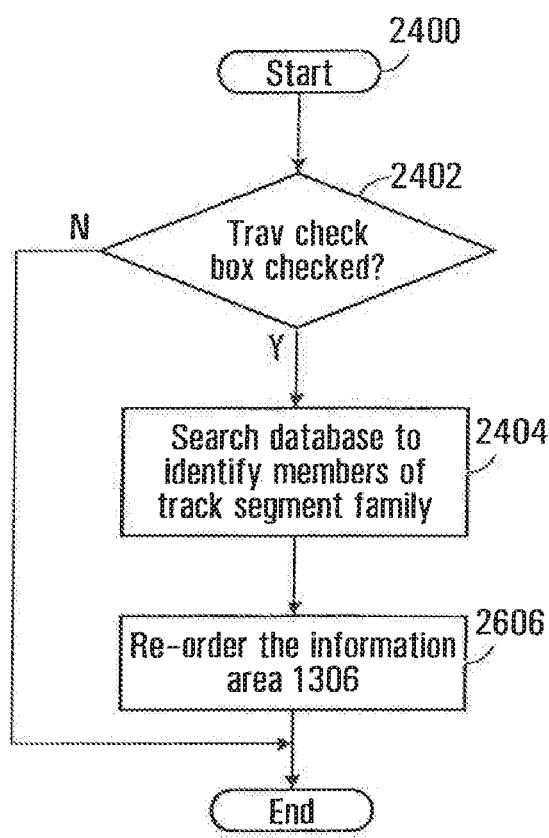
FIG. 22 is a flowchart illustrating the process of querying a database and arranging the on-screen display to show a track segment family.

The query operation that occurs when the Tray (Traversed) check box 1328 is checked is illustrated in greater detail in FIG. 22. The process that is performed by the program logic starts at step 2400. At decision step 2402, the status of the checkbox 1328 is assessed. If the checkbox 1328 is checked the process continues to step 2404. In this step, the database 14 is queried to identify the track segments that are adjacent or can be considered child tracks in connection with the parent track (the track segment whose traversed check box was checked).

The identification of adjacent tracks and child tracks is done on the basis of geographic proximity. Tracks that are geographically close to one another within a predetermined area can be considered to be adjacent tracks. The predetermined area can be small or large, depending on the degree of granularity desired. On the other hand, child tracks and the parent track share common elements, such as the points at which the tracks connect with one another, which can be used as a basis to perform the topology discovery. There are a number of possible ways to electronically describe in the database the topology of the railway infrastructure that can be used to identify adjacent or child tracks without departing from the spirit of the invention.

When the child and the adjacent tracks have been identified from the database, the information is used in step 2406 to re-order the display such as to show all the track segments as a group. The group presentation is done, in this example by re-ordering the entries in the list such that they show consecutively on the display. Further enhancements are possible, one being the inclusion of a frame or box surrounding a grouping, such as to visually distinguish it from other entries. Another example of grouping, which does not involve the consecutive arrangement of entries, is to highlight each entry in a way to make the group entries of entries distinguishable from other entries that do not belong to the group.

Specifically, and with reference to FIG. 13, assume that the record against which the checkbox 1328 is checked is the first record 1330. The query operation outlined in FIG. 22 will generate the track segment group and display the track segment group below the record 1330. The record 1330 is highlighted, by using any appropriate technique, such as by displaying the record in a contrasting color, while the remaining members of the track segment group appear below without highlighting. In the example shown, the parent track segment 2304 has track segment members, including the track segment 2306 and 2308 discussed earlier and also the track segment members 1336, 1338, 1340, 1342, 1344, 2302, 1348 and 1350.

In this fashion, the display 1300 shows to the operator the track segments that exist in the vicinity of a given track segment that is being traversed or visually inspected, such that those track segment can also be traversed or visually inspected. In this fashion, the operator can see the track segments in his workspace so that they can all be inspected. This reduces the possibility of missing a track segment that would require the user to come back to complete the inspection process. Again, the extent of the workspace can vary without departing from the invention. For example, one possibility is to determine the extent of the track segment group on the basis of the number of track segment the user can inspect in a certain time frame, such as a day. Another possibility is to show all the track segments within a predetermined geographical space, such as a square mile. Evidently, other possibilities exist without departing from the spirit of the invention.

8. A Last Visual column 1354 that contains the date at which the last visual inspection was performed.
9. A Last Traversed column 1356 that contains the date at which the track segment was last traversed.
10. A column 1360 that shows the relationship between the different track segments in a family. In this column, P stands for parent, C indicates a child track segment and A indicates an adjacent track segment.

If during the inspection operation the user encounters a condition that needs to be recorded, this can be done by activating the control 1364, which is in the form of a clickable button, in order to invoke the condition recording function described earlier. When all the inspection information has been entered in the information area 1300 and any condition recorded the user activates the control 1362, which is in the form of a clickable button, to conclude the inspection operation.

Referring back to FIG. 14, the activation of the submit control 1424 may as an option, in addition to invoking the on-screen display shown in FIG. 13, also invoke sequentially or simultaneously the on-screen display shown in FIG. 33.

The on-screen display shown in this figure shows an information area 3500 providing a list view of various conditions that have been recorded against track segments in the general area specified in the diagram of FIG. 14. In this fashion, while the user is performing inspections he/she can also monitor known conditions to determine if anyone of them is worsening and that may require some urgent action. The list view identifies the sub-components of the track segment of interest along with the remedial and/or maintenance activities previously logged.

Figure 15:
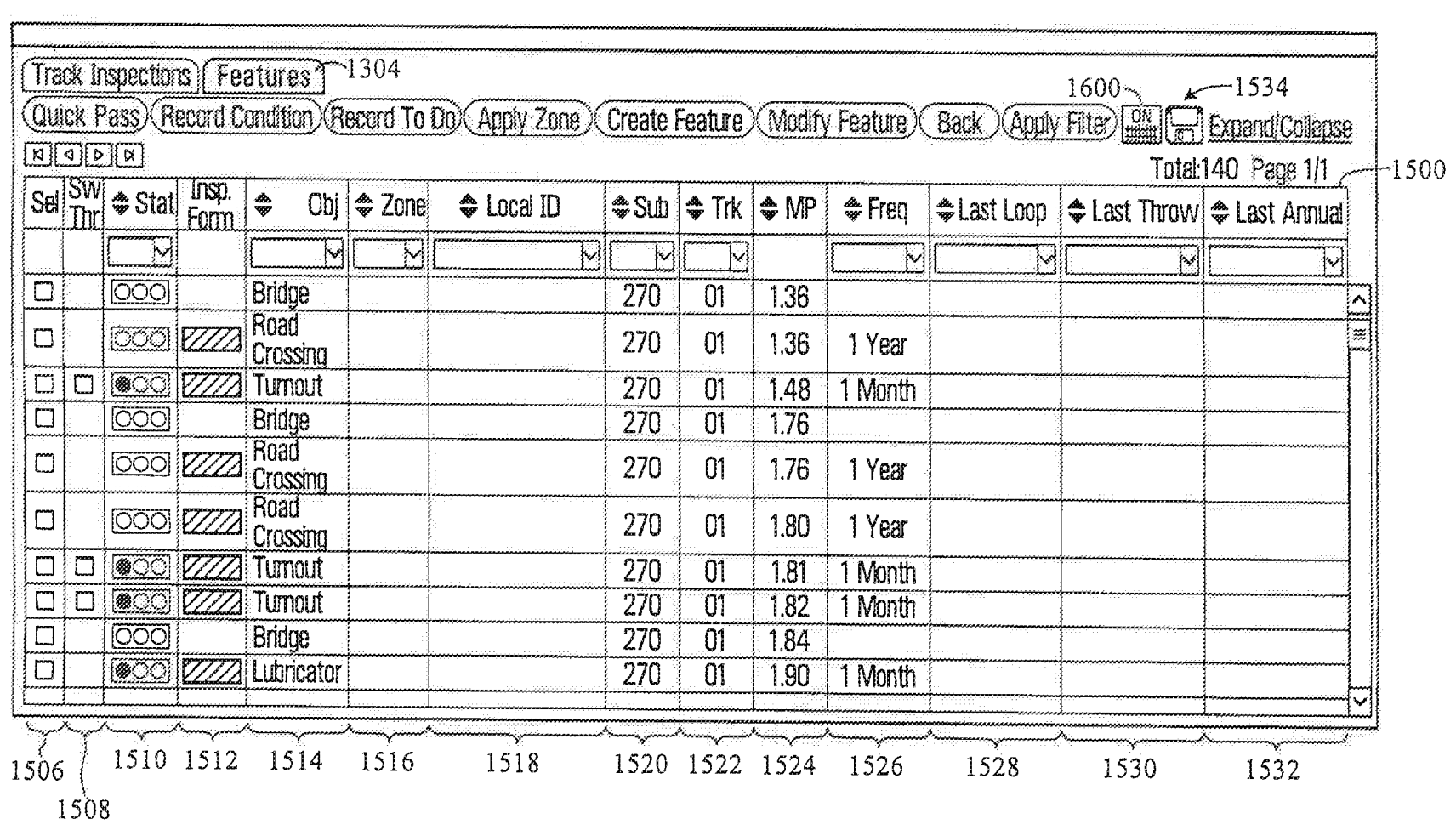

FIG. 15 shows an on-screen display of an information area 1500 allowing a user to log feature inspections. This view would be derived from the on-screen display of FIG. 13 when the control 1304, in the form of a clickable tab is actuated. Generally speaking, the information presented in the information area 1500 is structured in a similar fashion to the information presented in the information area 1300 in connection with track segments. More specifically, the information area 1500 includes:

A selection (Sel) column 1506 to be able to select any one of the records listed, where each record is associated with a given feature.
A Switch Throw (Sw Thr) column 1508.
An inspection status indicator 1510 similar to the inspection status indicator 1312.
An inspection form 1512. The inspection form 1512 is a clickable control that when actuated brings an on-screen display of a form to log the results of an inspection performed on the feature associated with the record.
An object description 1514 to describe the feature associated with each record.
A Zone 1516, Local ID 1518; Subdivision 1520 and Track 1522 to identify the location of the feature.
A Mile Position (MP) 1524 to provide the distance of the feature from a reference point.
A Frequency (Freq) 1526 to provide the frequency of inspections.
A Last Inspection (Last Insp) 1528 to provide the date of the last inspection.
A Last Throw 1530 to indicate the date at which the last throw was made.
A Last Annual 1532 to provide the date of the last annual inspection.

The entry of information necessary to log the inspection in connection with a certain feature of the railway infrastructure is done in a similar fashion as described earlier and as a result, this explanation need not be repeated. Suffice it to say that the user can select any one of the records appearing in the information area 1500 and perform operations on them including recording one or more conditions by using the controls in a set of controls 1534.

Note that the on-screen display of FIG. 15 can also be accessed from the dashboard 1900 shown in FIG. 3. Specifically, referring back to FIG. 3, the information display area 1900 has a set of controls 386, in the form of virtual clickable buttons that can be used to log the results of an inspection.

Figure 16:
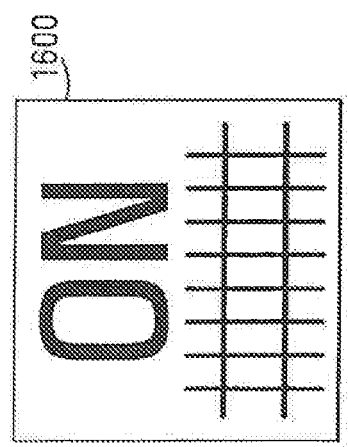
FIG. 16 is an enlarged view of GUI controls used for invoking GPS functionality.

FIG. 16 illustrates a control that can be used in connection with the on-screen displays for logging the results of component inspections to provide location information and thus facilitate the identification of the component (either a track segment or a feature) that is to be inspected. The control is in the form of a virtual clickable button 1600 that when actuated, will process location information and will guide the user toward the component to be inspected.

In a non-limiting embodiment, the inspection process is performed with the assistance of the workstation 20 shown in FIG. 1, which is a portable device such as a PDA or a laptop. The workstation has a location information generator capable of producing information that identifies the location of the workstation 20. In a specific example, the electronic device 20 is equipped with a Global Positioning System (GPS) receiver 36 (shown in FIG. 2) that can obtain location information in the form of GPS coordinates associated with its location. This assumes that the GPS receiver has an unobstructed view of the sky to pick up satellite signals. These GPS coordinates can be displayed to the user on a screen of the workstation 20, in relation to a map of the surroundings, specifically showing to the user their location relative to the map.

These GPS coordinates can enable the user to locate him/her in relation to specific components to be inspected.

Alternatively, the location information generator can rely on a triangulation process by measuring signals generated by base stations of a cellular network, nearby the workstation 20.

In a more specific example shown by FIG. 15, when the control 1600 is activated the order in which the features are presented in the information area 1500 will change to show first the feature that is closest to the location of the workstation 20. As the workstation 20 moves closer to that feature the information shown in the Mile Position (MP) column 1524 will change and will display the distance from the workstation to the feature. For accuracy and ease of identification, the distance can be displayed in feet. Additional guidance elements can be provided to assist the user in locating the feature of interest. For example, when the workstation is within a certain distance of the feature (e.g. 50 feet or less), the record associated with the feature that is being tracked will be highlighted, an audible alarm can be generated or both used simultaneously or in sequence. This can be useful for the operator as an initial announcement that the workstation 20 is getting closer to the feature. As such there is no need to constantly monitor the Mile Position (MP) 1524 indications. When the workstation 20 gets even closer to the feature (e.g. within 20 feet or less, assuming the location information generator is capable of such resolution), a different highlighting can be issued to warn that the feature is now very close.

Another option as briefly discussed earlier is to show the location information over a map that also shows the feature to be reached. The map can:

1. Show a portion of the railway infrastructure with the relevant components such as track segments and features, where the component that is to be inspected is identified in any suitable manner such as by an appropriate symbol;
2. The map can overlay the information area 1500 completely or partially. Another possibility is for the map to appear as a semi-transparent overlay such that information from the information area 1500 can still be viewed through the map;
3. The map can identify the location of the workstation 20 on the map, allowing the user to visually track the progress toward the feature;
4. The map can provide explicit guidance, such as by indicating the distance to the feature and providing directions, if applicable.

Figure 23:
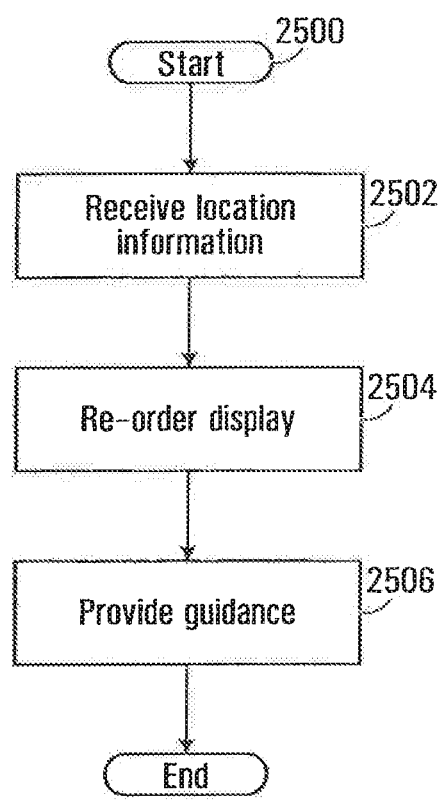
FIG. 23 is a flowchart of a process to provide to the user automatic guidance toward a component that is to be inspected or repaired.

The above process is illustrated in FIG. 23. The process starts at 2500. In step 2502, the workstation 20 receives location information. When the workstation 20 has a GPS receiver then the location information is in the form of GPS coordinates but other location information generators can be used without departing from the spirit of the invention. In step 2504, the program logic (not shown) processes the records of the components to identify the ones closest to the workstation 20. It is worth noting that each component in the database 14 is associated with coordinates information that identifies the location of the component. The program logic processes this information in order to determine the components that are geographically closest to the workstation 20 and re-order the display accordingly.

In step 2506 the program logic uses the location information generated by the GPS receiver in order to provide guidance to the user. Guidance can be provided in different ways, such as:

1. Providing a proximity enunciation to indicate that the component that is being tracked is near. This can be done by highlighting (and/or using an audible alarm) the record in the information area 1500 when the workstation 20 is within a certain distance to the component;
2. Showing the distance to the component;
3. Providing direction information to indicate the direction of travel in order to reach the component;
4. Providing indication that the component has been passed and that the user should turn back.

The above examples are not limiting and guidance can be provided in other ways as well without departing from the spirit of the invention.

Note that the location information can be useful not only in the context of component inspection but also in the context of component remedial action. For example, location information can be used to provide guidance to a work crew toward a component that needs to be repaired.

FIG. 17 shows an on-screen display of an information area 1700 that is being used to provide status information about currently outstanding conditions and work assignments intended to rectify those conditions. The information area 1700 can be used on the workstation 20 (which is mobile) by work crews in order to locate a condition on which work needs to be performed and also to log the results of the maintenance operation performed on the condition.

The information area 1700 uses the list format to present the records 3206 associated with different conditions recorded against track segments or features. Each record 3206 is, therefore, associated to a given condition. If a component of the railway infrastructure has multiple conditions, several records 3206 will be created, each associated with a condition 3206. More specifically, the information area 1700 includes:

A selection (Sel) column 1706 to be able to select any one of the records listed, where each record is associated with a given condition.

A Priority (P) 1708 that denotes the level of priory attributed to the condition, such as Urgent (UR), Near urgent (NU), or a priority level P1, P2, etc. Note that UR, NU, P1, P2, etc represent a decreasing order of priority.

A subdivision 1710 and a track 1712 to identify the location of the feature.

A Mile Position (MP) 1714 that provides the distance of the component from a reference point.

An object description 1716 that describes the component associated with each record.

A condition description 1718 that describes the condition recorded against the component.

A remedial activity 1720 that describes the remedial activity set when the condition was recorded.

An assigned 1722 that identifies the work center to which the condition was assigned and which is responsible to rectify the condition such as to carry out the maintenance activity.

An operation 1724 that describes the particular operation that is to be performed as a result of the work assignment in connection with the condition.

A date 1726 that is the date at which the condition was recorded.

A due date 1728 that is the date at which the work to remedy the condition must be completed.

Figure 24:
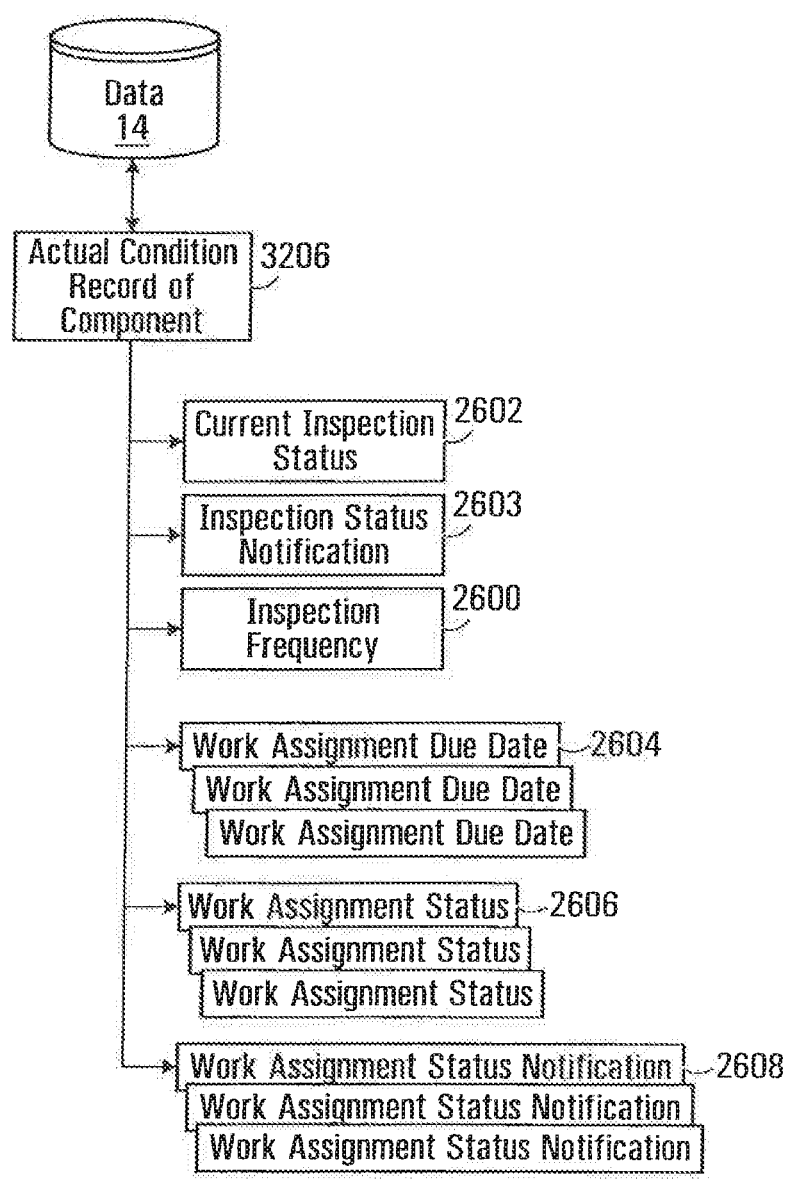
FIG. 24 is a block diagram of a data structure that maps different components of the railway infrastructure to inspection frequency data, inspection status data, work assignment due dates and work assignment status.

FIG. 24 is a block diagram that illustrates an example of a data structure implementing the actual condition record 3206. That data structure can be used to generate deadlines for performing inspections and for concluding work assignments. Each component of the railway infrastructure that is stored in the database 14 is associated with data that allows establishing an inspection schedule, inspection status, work assignment due dates and work assignment status. Specifically, an inspection frequency data 2600 determines the interval at which the component is to be inspected, either visually or with electronic equipment. The inspection frequency is not necessarily the same for all components. Some components need to be inspected more often than others and the inspection frequency information 2600 associated with them will reflect that. Also, more than one inspection frequency information can be associated with a given component. For instance in the case of a track segment an inspection frequency will be provided in connection with visual inspections and a different inspection frequency will be provided in connection with automated inspections such as when the track segment is being traversed.

A current inspection status 2602 indicates if the inspection on the component is done or not done. The inspection status notification 2603 is the type of indication to the user about the inspection status, such overdue, due, completed or no outstanding action is required. Many different indicators can be used to specify an inspection status and those are only examples.

A work assignment due date 2604 is a date that indicates when a certain work assignment falls due. Note that multiple work assignment due dates may exist in connection with a component, when each work assignment addresses a different condition of the component.

A work assignment status 2606 indicates if a given work assignment has been completed or not. As in the case of the work assignment due date 2604, there may be multiple work assignment status' 2606, where each work assignment status 2606 is associated to a given work assignment due date 2604.

Finally, a work assignment status notification 2608 is an indication to the user about the work assignment status, such as completed or overdue.

Figure 25:
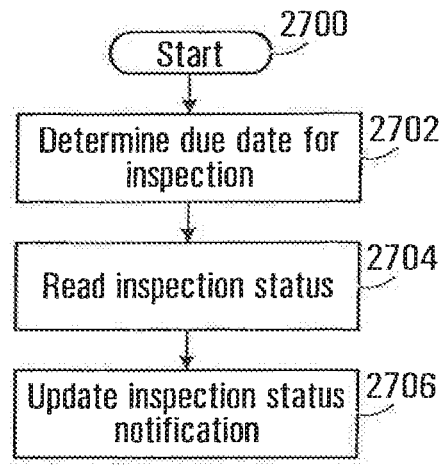
FIG. 25 is a flowchart of a process for updating the inspection status of a component of the railway infrastructure.

The flowchart shown in FIG. 25 illustrates the internal processing used to determine the due date for inspections and also update the inspection status 2602 and the inspection status notification 2603. The processing is performed by the program logic for each component in the database 14. More specifically, the process starts at step 2700. In step 2702 the program logic determines for a given component what the due date for inspection is. This involves reading from the database 14 the inspection frequency and then generating a due date at which the inspection has to be completed. In step 2704 the program logic reads the inspection status 2602 from the database 14 to determine if the inspection has been performed or not. If the inspection has not yet been done, then the inspection status 2602 is set to not complete and the inspection status notification 2603 is updated at 2706 to indicate that the inspection is due.

The updating of the inspection status notification in step 2706 can be done only within a certain time window that is relevant to the inspection due date. For example, consider a component that must be inspected monthly. The time window therefore is set to be one month. The due date to complete the inspection falls at the end of the month. At the beginning of the month, step 2702 determines that the due date to complete the inspection is the end of the month. Step 2704 determines the inspection status which shows that the inspection is not completed. However, in light of the fact that the inspection due date is far away no active notification (step 2706) is generated. Taking the "traffic light"-style inspection status indicator(s) shown in FIG. 5, for example, the status of no active notification may be shown by blanking all the lights.

The no active notification status in step 2706 is maintained for a predetermined time period, after which it is deemed appropriate to generate an active notification to prompt the user to take action. The predetermined time period can be a week. In other words, during the first week of the month the inspection status indicator is blanked. At the beginning of the second week of the month, the inspection status indicator changes to indicate that an inspection is due. This may be shown by the inspection status indicator as a yellow light. If at that point the user performs the inspection the software updates the active notification 2706 to reflect this. A completed inspection can be shown by a green light. Note that the green light can be maintained until the due date is reached (i.e. the end of the month), at which time the software resets for a new monthly cycle beginning with a blanked display for a week.

Now assume that the inspection is delayed. The yellow light will remain "on" until a critical period is reached which can be selected to be the due date (i.e. the end of the month) or a period shortly before or after the due date. The critical period condition is signaled by the inspection status indicator with a red light. The red light will remain "lit" until the inspection is performed.

The current inspection status in step 2602 changes from inspection non-completed to inspection completed as a result of logging the results of the inspection process, which was described earlier.

Note that the inspection status changes discussed above also drive the dashboard notifications about the status of the inspections, shown in FIG. 3.

Figure 26:
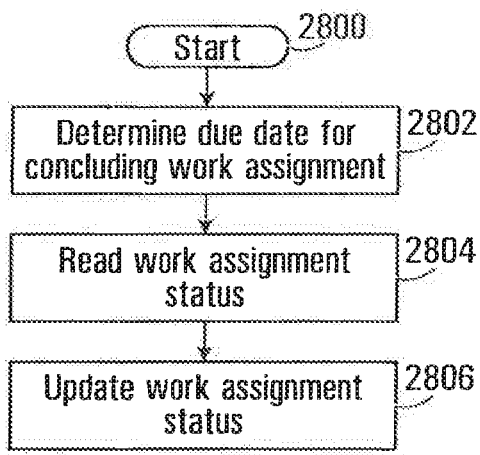
FIG. 26 is a flowchart of a process for updating the work assignment status in connection with a component of the railway infrastructure.

A somewhat similar approach is followed in connection with the process to determine due dates for completing work assignments. The process is shown in greater detail in FIG. 26 and starts at step 2800. In step 2802, the program logic determines the date for concluding the work assignment. This is done by reading the work assignment due date 2604 associated with the condition on which the process is being run. In step 2804, the program logic reads the work assignment status which indicates if the work assignment is completed or not completed. Step 2806 updates the work assignment status notification. Specifically, if the work assignment status from step 2606 indicates that the work assignment is not completed, then the update in step 2806 will set the work assignment status notification step 2608 to indicate that the work assignment is outstanding. This indicator is used in the various on-screen displays, in particular the dashboard shown in FIG. 3, to indicate if a work assignment is overdue or not.

Figure 27:
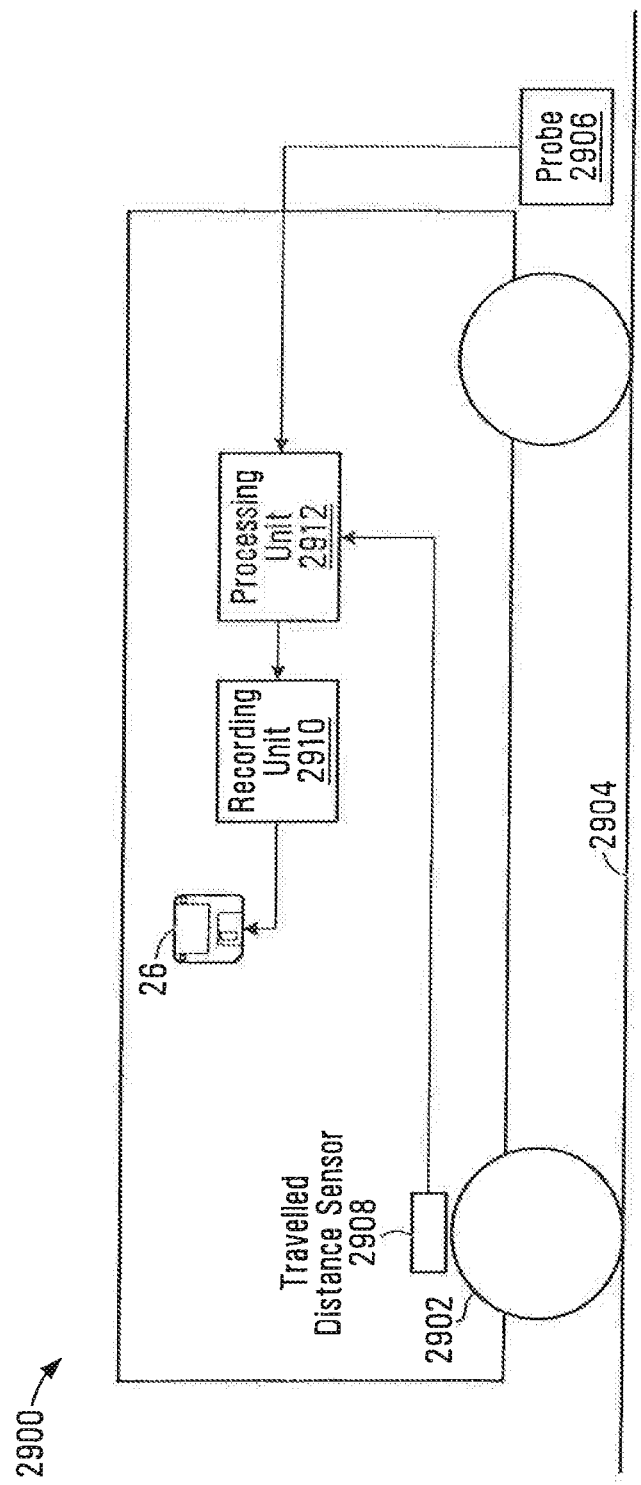
FIG. 27 is a block diagram of a vehicle to automatically perform track segment inspections.

Referring back to FIG. 1 and in particular to the workstation 18, that workstation is shown connected to a reader 24 for reading data stored on a portable storage device 26. The portable storage device 26 holds inspection data derived from an inspection device that includes a probe or transducer probing the track segment to identify flaws. The inspection device which typically would be a vehicle that is manually towed or pushed, or is a self-propelled vehicle travels over the rail to perform the inspection process. A block diagram of such a vehicle 2900 is shown in FIG. 27.

The vehicle 2900 is a self-propelled vehicle having wheels 2902 that ride on a set of rails 2904. The vehicle 2900 carries at its front end a probe 2906 that probes the rails 2904 to identify flaws. A wide variety of probes can be used, namely probes that perform:

- Ultrasonic inspection of the rails 2904: The probe 2906 is coupled to the rail 2904 surface by any suitable coupling medium in order to allow ultrasound waves to reach the rail 2904 and propagate into it. The probe 2906 then picks-up the reflected waves and transmits the resulting signal to a processing unit 2906.
- Inductive testing of the rails 2904: The probe 2906 generates an alternating magnetic field that induces eddy currents in the rails 2904. When damage in the rails 2904 exist, the flux of the eddy current is altered. Those alterations can be picked up by the probe 2906. The signal from the probe 2906 is then transmitted to the processing unit 2906.

Note that the probe 2906 may be designed to perform testing according to one or more than one of the testing techniques described earlier. On a related note, the processing unit 2912 will be adapted to the specific probe 2906 design, such as for ultrasonic, inductive or optical testing.

The processing unit 2912 receives and processes the data that the probe 2906 generates and also receives a signal to indicate distance travelled. The signal originates from a travelled distance sensor 2908. The processing unit 2912 may or may not perform significant processing on the signal originating from the probe 2906. For example, the processing unit 2912 may digitize the signal, perform format conversion or perform any other manipulation to facilitate the signal interpretation. The processing unit 2912 also will pair the signal from the probe 2906 with the signal from the travelled distance sensor 2908 in order to map the probe 2906 output with information indicative of the location where the output was produced. Accordingly, the processing unit 2912 generates a stream of data including rail inspection information and location information. In this fashion, if the inspection information identifies a defect, the associated location information can be used to determine where the defect is, such that corrective action can be taken. The inspection information can be in any suitable format without departing from the spirit of the invention. Similarly, the location information can be any suitable format as well.

The stream of data is then conveyed to a recording unit 2910 that can record the data to the portable storage device 26.

Once the inspection operation is completed, information stored in the portable storage device 26 is processed by the software executed by the server 12. The processing is illustrated in greater detail by the flow chart shown in FIG. 28.

The process starts at step 3000. In step 3002, the information stored on the portable storage device 26 is read and prepared for processing. In step 3004, the database 14 is queried to extract from it tolerance information that defines a permissible degree of variation from a certain standard. This tolerance information is associated with the particular type of inspection that was performed and the results of which are stored on the portable storage device 26. For instance, when an ultrasonic inspection is performed, specific tolerance information for that type of inspection will be loaded in step 3004 against which the results of the inspection will be compared. Note that the tolerance information loaded in step 3004 may be associated with two or more inspection methods when several different methods have been used to traverse the rail section.

The tolerance information, the inspection data and the location data are processed in step 3006. The processing includes comparing the inspection data 3006 against the tolerance information that allows determining if the inspection data is normal or is abnormal and thus indicating a fault in the rails 2904. The comparison process is shown as step 3008. As long as the inspection data remains within the tolerance range defined by the tolerance information, no action is taken since the results show no abnormality. However, when an abnormal indication occurs, the processing continues in step 3010 where a condition record is automatically generated to record the abnormality.

What constitutes an abnormality can vary according to the particular inspection method that is being used and/or the degree of sensitivity desired. In one possible example, an abnormality can be any deviation from a narrow tolerance range. Another less strict example is a situation where the tolerance range is widened such that only major deviations will constitute abnormalities. Yet another possibility is to design the tolerance range such as to provide more than two possible outcomes (pass/fail) in which the results of the inspection can be classified. For instance there can be provided an outcome that falls between the pass and fail outcomes, in which are classified deviations from a pre-set standard that are relatively small. Accordingly, the tolerance information includes a set of ranges against which the inspection data is compared and that provide a more comprehensive classification structure for the inspection results. Ultimately the classification structure can be designed to provide a high level of detail such as to classify the inspection data in a precise fashion allowing to accurately categorizing deviations from a pre-set standard.

Also note that when multiple inspection methods have been used, the process described above is for all practical purposes run in parallel against each inspection data to identify flaws.

If in step 3008 a flaw is found that is considered to be of sufficient magnitude to denote a failure, then processing continues at step 3010 which creates a condition record in the database 14. Two options are possible: the first option provides sufficient information to a human operator such that the human operator can validate the information and manually enter data in the system to create a condition record. Therefore, the operator is presented with the results of the processing performed in step 3006 so that if any deviation outside the tolerance range exists those deviations can be evaluated and validated. The evaluation includes considering the results of the processing at step 3006 to determine a possible underlying condition that has caused the abnormality during the inspection. Once a cause is determined a condition record can be generated by manual entry as discussed earlier.

Figure 28:
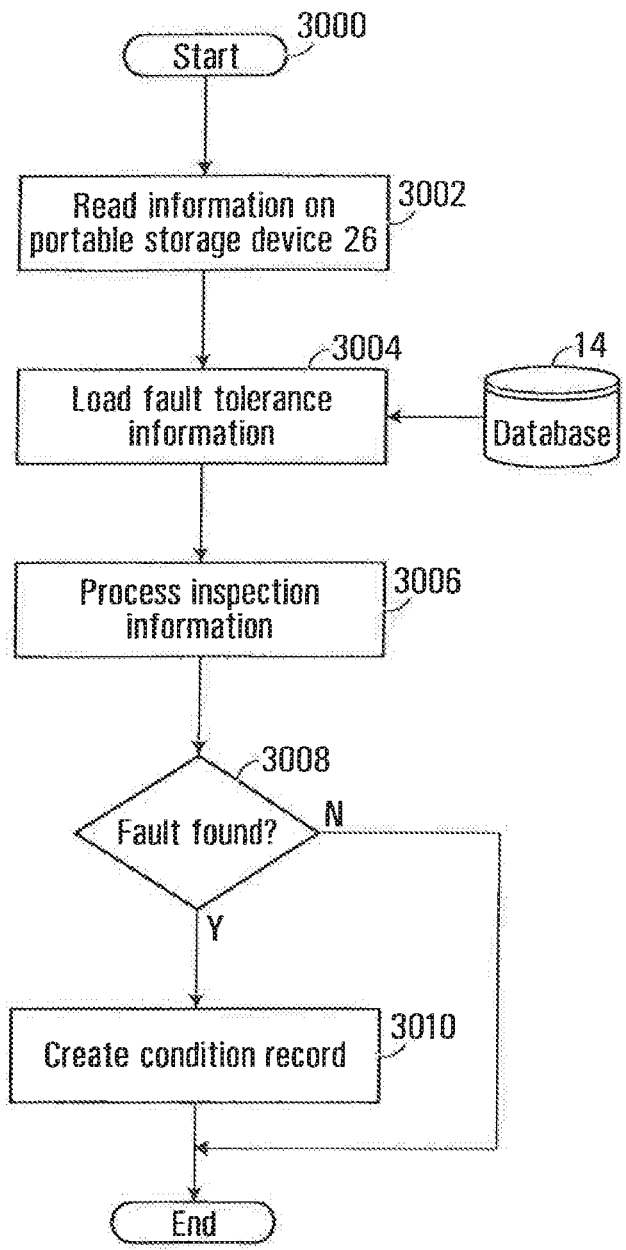
FIG. 28 is a flow chart for processing information gathered from a rail inspection vehicle.
Figure 29:
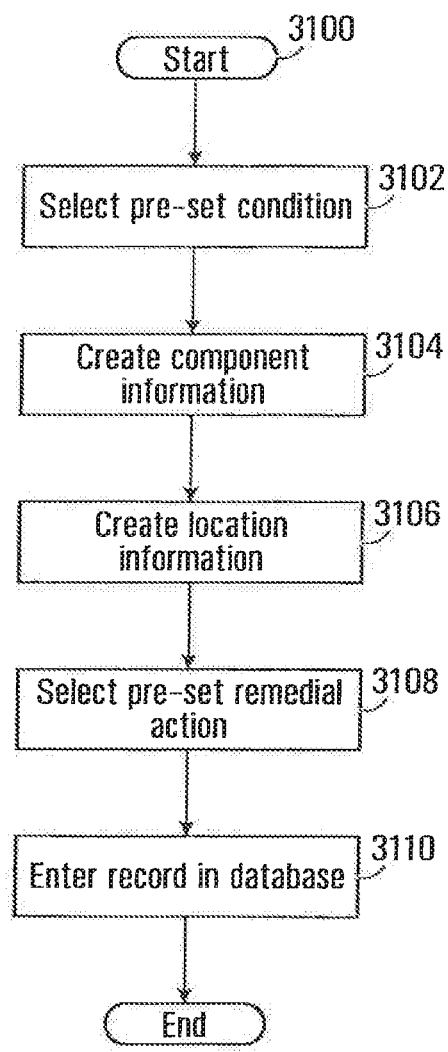
FIG. 29 is a flowchart of a process for automatically generating a condition record.

The second possible option is to create the condition record automatically with as little (or no) human intervention. The processing logic for this option is shown in greater detail in FIG. 29. The processing is performed by the software and starts at 3100. In step 3102, processing at steps 3006 and 3008 from FIG. 28 is performed against a set of possible conditions in which a fault can be classified. The set of conditions will vary with the inspection method chosen and the component that is the subject of the inspection. In the examples discussed earlier, the component is a track segment but the principle can also apply to other railroad infrastructure components as well on which automated inspections can be performed.

During this step, the logic uses the results of the comparison performed between the inspection data and the tolerance information to select a condition from a set of possible conditions. The selection performed at the end of step 3102 involves matching the abnormality observed during the inspection to a particular condition in the set of conditions. In one possible example, the ultrasonic and/or the inductive testing can be used to automatically detect fissures in the rail.

In step 3104, the component information is produced. The component information identifies the actual component being tested. In the case of a track inspection, the component identified would be the track segment.

In step 3106, the location data is used to generate location information to identify the location of the condition. This step may simply copy the location data provided with the inspection data or may involve processing to convert the location data in another format, for example.

Step 3108 is optional and involves selecting a certain remedial action on the basis of the condition selected. The remedial action selection may be automatic in the sense that for each condition a predetermined remedial action is mapped in the system. In this fashion, the selection of the condition also selects the remedial action automatically. Alternatively, the remedial action selection may involve a human operator that is presented with the selected condition and two or more options regarding remedial actions to choose from. The remedial action may include remedial activities that are of temporary nature and that are implemented primarily from a safety standpoint, and may also include maintenance activities to provide a long-term resolution of the condition.

Although not shown in the figures, a level of priority for the condition can also be generated, either automatically (i.e. by mapping a predetermined priority level to a condition) or manually, where a human operator chooses the level of priority.

In step 3110, the condition record is entered in the database 14. The condition record thus created is the same as it would have been created manually and can be tracked in the dashboard shown in FIG. 3, as previously described.

Referring back to FIG. 1, one of the workstations shown, namely the workstation 20 is a mobile device such as a PDA, a laptop or other. The workstation 20 can be used conveniently in the field to perform inspection-related operations on the railway infrastructure allowing the operator to perform data entry directly via the user interface described earlier. In this fashion there is no need to separately record the results of inspections and conditions observed which later need to be transcribed in the system using the tools discussed earlier. A single information capturing operation is effected, which reduces the possibility of errors in recording the inspections and conditions.

As best shown by FIG. 2, the workstation 20 has an internal memory 32 in which is stored the software for execution of the processor 30 and also data on which the processor performs tasks. Before conducting any operation in the field, the workstation 20 is synchronized with the main database 14. This operation has the effect of copying at least some of the data from the database 14 to the memory 32 such that when the workstation 20 is no longer connected to the network, to the server 12 and the database 14, it will still contain sufficient data to allow the operator to perform the inspection or condition recording operations. For instance, the information that is stored in the memory 32 includes location information about the railway infrastructure components that need to be inspected to allow the operator to find them (optionally with the assistance of the GPS receiver 36), status information about the inspection, components and work assignments, among others. The software (which is executed by the processor 30) allows the operator to record the necessary information in connection with an inspection and/or a condition. The information that is entered is stored in the memory 32 of the workstation 20.

After the operations in the field have been completed, the workstation 20 is synchronized again with the database 14. The new synchronization operation copies the newly recorded information by the operator such that the inspection results and/or created conditions are now stored in the main database 14. Similarly, any changes or additions to the data contained in the main database 14 that need to be in the memory 32 to perform mobile inspections are transferred to the memory 32 such that the information is the most up to date.

The example of implementation of the invention described above relates to a railway infrastructure.

However, the present invention is not limited to this implementation only and can also be used in conjunction with a wide variety of linear assets. Other examples of implementation are discussed below:

1. Pipeline.

A pipeline is a linear asset infrastructure in the sense that it includes a network of pipes that need to be inspected. Thus, the pipeline network is made up of components, namely piping and also features, such as pumps. The pipeline is used to transport a fluid, such as a liquid or gas. The liquid can be a petroleum product or other industrial product but can also be water or another liquid intended for human or animal consumption. The pipeline can be used to gather the product to be transported from small production facilities (such as wells) to a larger treatment facility. Alternatively, the pipeline can be used for the long-range transport of the product, such as between cities, countries and continents. Also, the pipeline can be used mainly for distribution in order to carry the product to the individual customer.

The fluid transport components of the pipeline include pipes made of metal or plastic having widely ranging diameters depending on the particular application. The pipeline features would include supply stations that inject the product in the pipes, compressor/pumping stations that move the product in the pipes (typically several compressor/pumping stations are provided which are distributed along the pipeline length), valves to regulate the flow of the product in the pipes, regulators to regulate the pressure in the pipeline and delivery stations to deliver the final product to the customer.

In this context, the invention can be used to track inspection due dates, record inspection results, log and monitor conditions and remedial actions and assign and track work assignments in connection with the pipe segments and the pipeline features in the same way as described in connection with track segments and railway infrastructure features.

2. Electricity Distribution Network.

An electricity distribution network is also a linear asset infrastructure since it has electricity carrying components (cables) and features (such as pylons or transformers) that work in conjunction with the electricity carrying components to perform an electricity transport function. The electricity that is carried can be of the alternating current type or the direct current type and the voltage and currents used can vary without departing from the spirit of the invention.

The electricity carrying components would typically include cable segments while the features would include pylons or poles to support the cables, transformers to alter the voltage, and protection components such as fuses or breakers, among others.

Although various embodiments have been illustrated, this was done for the purpose of describing, but not limiting, the invention. Various modifications will become apparent to those skilled in the art and are within the scope of this invention, which is defined more particularly by the attached claims.

The invention claimed is:

1. A method for inspecting a railway infrastructure having components selected from the group consisting of track segments and features, the method including:
   a) producing a condition record when an in-field inspection of a first track segment determines that the first track segment manifests a condition that represents a deviation from an operational requirement, the in-field inspection including a visual inspection of track segments of a railway infrastructure, the producing of the condition record including:
      i) rendering a first graphical user interface on a first display of a portable computing device used by an inspector performing the in-field inspection, the graphical user interface having:

1) a first data input field configured to receive information identifying the condition observed in connection with the first track segment;
2) a second data input field configured to hold information describing a maintenance activity to be performed to rectify the condition observed in connection with the first track segment;
3) a third data input field configured to hold information describing a temporary remedial action defining a change in an operational procedure affecting train traffic over the first track segment to be implemented before the maintenance activity to rectify the first condition is completed;

ii) providing a database for storing condition records and maintenance activity records associated with components of the railway infrastructure that have been identified via in-field inspections as manifesting conditions that represent deviations from the operational requirements of the components;

iii) electronically transmitting the information in the first and second data input fields to the database and creating in the database a new condition record and a new maintenance activity record in connection with the first track segment at least in part on the basis of the information in the first and second data input fields;

b) driving a work list indicator in a second graphical user interface rendered on a second display that is remote from the first display on the basis of the maintenance activity records stored in the database, the work list indicator:

i) showing a list of maintenance activities associated with different components of the railway infrastructure against which condition records have been recorded, the maintenance activities are characterized by respective levels of urgency;

ii) distinguishing the maintenance activities on the basis of the respective levels of urgency.

2. A method as defined in claim 1, including storing in the database data describing the temporary remedial action in the third data input field and associating the data describing the temporary remedial action with the new condition record.

3. A method as defined in claim 1, including performing multiple in-field inspections by different inspectors of track segments that are remote from each other and creating condition records and maintenance activity records for track segments that present deviations from respective operational requirements, the work list indicator aggregating maintenance activity information originating from multiple in-field inspections that are performed in different locations of the railway network.

4. A method as defined in claim 1, wherein the database links one or more conditions a track segment of the railway infrastructure may be affected by, to respective sets of predetermined temporary remedial actions, the method including:
a) searching the database to identify the set of predetermined temporary remedial actions linked with the condition observed in connection with the first track segment;
b) displaying via the first graphical user interface the set of predetermined temporary remedial actions for allowing the inspector to perform a selection of a temporary remedial action among the predetermined set of remedial actions, the selection of a temporary remedial action among the set of predetermined temporary remedial constituting a data entry in the third data input field of the graphical user interface.

5. A method as defined in claim 4, wherein the set of temporary remedial actions associated with the condition observed in connection with the first track segment includes a slow order to reduce a speed of train traffic over the first track segment.

6. A method as defined in claim 5, wherein the set of temporary remedial actions associated with the condition observed in connection with the first track segment includes an order to preclude train traffic over the first track segment.

7. A method as defined in claim 1, wherein the database links different components of the railway infrastructure to respective sets of predetermined conditions that could affect each component, the method including:
a) receiving at the database via the first graphical user interface identification information identifying the first track segment and performing a search in the database to identify the set of predetermined conditions associated with the first track segment;
b) displaying via the first graphical user interface the set of predetermined conditions identified by the search for allowing the inspector to perform a selection of a condition among the identified set of predetermined conditions that matches an actual condition of the first track segment that is observed by the inspector, the selection of a condition among the set of predetermined conditions constituting a data entry in the first data input field.

8. A method as defined in claim 7, wherein the set of predetermined conditions associated with the first track segment includes two or more conditions relating to defects of a crosstie of the first track segment.

9. A method as defined in claim 8, wherein the defects include a broken crosstie.

10. A method as defined in claim 8, wherein the defects include a cracked crosstie.

11. A method as defined in claim 8, wherein the defects include a loose crosstie.

12. A method as defined in claim 8, wherein the defects include a missing crosstie.

13. A method as defined in claim 8, wherein the defects include a crosstie that is not properly aligned with the rail.

14. A method as defined in claim 8, wherein the defects include an eroded crosstie.

15. A method as defined in claim 1, wherein the database links one or more conditions that can be recorded against a component of the railway infrastructure to respective sets of predetermined maintenance activities suitable to address the conditions the method including:
a) receiving at the database via the first graphical user interface information derived from the first data input field identifying the condition observed in connection with the first track segment;
b) searching the database to identify the set of predetermined maintenance activities linked with the condition observed in connection with the first track segment;
c) displaying via the first graphical user interface the set of predetermined maintenance activities for allowing the inspector to perform a selection of a maintenance activity among the predetermined maintenance activities in the set, the selection of a maintenance activity among the set of predetermined maintenance activities constituting a data entry in the second data input field.

16. A method as defined in claim 15, wherein the first graphical user interface includes a fourth data entry field for holding information regarding a level of priority of the condition observed in connection with the first track segment.

17. A method as defined in claim 16, wherein the database links one or more conditions that can be recorded against a component of the railway infrastructure to respective levels of priority, the method including:
   a) searching the database to identify the level of priority linked with the condition observed in connection with the first track segment;
   b) displaying the level of priority identified by the searching in the fourth data entry field.

18. A method as defined in claim 16, wherein the database links one or more conditions selectable in connection with a component of the railway infrastructure to respective sets of predetermined levels of priority, the method including:
   a) performing a search in the database to identify the set of predetermined levels of priority linked with the condition observed in connection with the first track segment;
   b) displaying via the first graphical user interface the set of predetermined levels of priority identified by the search for allowing the inspector to perform a selection of a level of priority among the identified set of predetermined levels of priority, the selection of a level of priory among the set of predetermined levels of priority constituting a data entry in the fourth data input field.

19. A system for managing inspection operations in a railway infrastructure having components selected from the group consisting of track segments and features, the system comprising:
   a) multiple mobile computing devices, each computing device including a display, a CPU, a machine readable storage medium encoded with non-transitory program instructions for execution by the CPU for rendering on the display a graphical user interface, the graphical user interface having:
      i) a first data input field configured to receive information identifying a condition observed by an inspector conducting an in-field inspection of a first track segment, the condition representing a deviation of an operational requirement of the first track segment;
      ii) a second data input field configured to hold information describing a maintenance activity to be performed to address the condition observed in connection with the first track segment;
      iii) a third data input field configured to hold information describing a temporary remedial action defining a change in an operational procedure affecting train traffic over the first track segment to be implemented before the maintenance activity to address the first condition is completed;
   b) a database in wireless communication with the multiple mobile devices for exchanging data with the multiple mobile devices, the database storing condition records and maintenance activity records associated with components of the railway infrastructure that have been identified via in-field inspections as being affected by conditions that represent deviations from the operational requirement of the components, in response to reception of the information in the first and second data input fields wirelessly sent to the database by the mobile computing device creating in the database a new condition record and a new maintenance activity record in connection with the first track segment at least in part on the basis of the information in the first and second data input fields;
   c) a computing apparatus in communication with the database to receive data derived from the maintenance activity records, the computing apparatus having a display, a CPU and a machine readable storage medium encoded with non-transitory program instructions for execution by the CPU of the computing apparatus for:
      (i) rendering a second graphical user interface on the display of the computing apparatus, the second graphical user interface displaying a work list indicator, the work list indicator configured for:
         showing a list of maintenance activities planned to be performed at various locations in the railway infrastructure on different components of the railway infrastructure against which condition records have been recorded by multiple in-field inspections, the maintenance activities being characterized by respective levels of urgency;
         distinguishing the maintenance activities in the list on the basis of the levels of urgency.

20. A system as defined in claim 19, the database is configured for storing the data describing the temporary remedial action in the third data input field and associating the data describing the temporary remedial action with the new condition record.

21. A system as defined in claim 19, wherein the database links one or more conditions a track segment of the railway infrastructure may be manifesting to respective sets of predetermined temporary remedial actions, the system being configured for:
   a) searching the database to identify the set of predetermined temporary remedial actions linked with the condition observed in connection with the first track segment;
   b) displaying via the first graphical user interface the set of predetermined temporary remedial actions for allowing the inspector to perform a selection of a temporary remedial action among the predetermined set of remedial actions, the selection of a predetermined temporary remedial action among the set of predetermined temporary remedial constituting a data entry operation in the third data input field of the first graphical user interface.

22. A system as defined in claim 21, wherein the set of predetermined temporary remedial actions associated with the condition observed in connection with the first track segment includes a slow order to reduce a speed of train traffic over the first track segment.

23. A system as defined in claim 22, wherein the set of predetermined temporary remedial actions associated with the condition observed in connection with the first track segment includes an order to preclude train traffic over the first track segment.

24. A system as defined in claim 21, wherein the database links different components of the railway infrastructure to respective sets of predetermined conditions that could affect each component, the system being configured for:
   a) receiving at the database via the first graphical user interface identification information identifying the first track segment and performing a search in the database to identify the set of predetermined conditions associated with the first track segment;
   b) displaying via the first graphical user interface the set of predetermined conditions identified by the search for allowing the inspector to perform a selection of a condition among the identified set of pre-determined conditions that matches an actual condition of the first track segment that is observed by the inspector, the selection of a condition among the set of predetermined conditions constituting a data entry operation in the first data input field.

25. A system as defined in claim 24, wherein the set of predetermined conditions associated with the first track segment includes two or more conditions relating to defects of a crosstie of the first track segment.

26. A system as defined in claim 25, wherein the defects include a broken crosstie.

27. A system as defined in claim 25, wherein the defects include a cracked crosstie.

28. A system as defined in claim 25, wherein the defects include a loose crosstie.

29. A system as defined in claim 25, wherein the defects include a missing crosstie.

30. A system as defined in claim 25, wherein the defects include a crosstie that is not properly aligned with the rail.

31. A system as defined in claim 25, wherein the defects include an eroded crosstie.

32. A system as defined in claim 19, wherein the database links one or more conditions that can be recorded against a component of the railway infrastructure to respective sets of predetermined maintenance activities suitable to rectify the condition, the system being configured for:
   a) receiving at the database via the first graphical user interface information derived from the first data input field identifying the condition observed in connection with the first track segment;
   b) searching the database to identify the set of predetermined maintenance activities linked with the condition observed in connection with the first track segment;
   c) displaying via the first graphical user interface the set of predetermined maintenance activities identified by the search for allowing the inspector to perform a selection of a maintenance activity among the identified set of predetermined maintenance activities, the selection of a maintenance activity among the set of predetermined maintenance activities constituting a data entry operation in the second data input field.

33. A system as defined in claim 32, wherein the first graphical user interface includes a fourth data entry field for holding information regarding a level of priority of the condition observed in connection with the first track segment.

34. A system as defined in claim 33, wherein the database links one or more conditions that can be recorded against a component of the railway infrastructure to respective levels of priority, the system being configured for:
   a) searching the database to identify the level of priority linked with the condition observed in connection with the first component;
   b) displaying the level of priority identified by the searching in the fourth data entry field.

35. A system as defined in claim 34, wherein the database links one or more conditions selectable in connection with a component of the railway infrastructure to respective sets of predetermined levels of priority, the system being configured for:
   a) performing a search in the database to identify the set of predetermined levels of priority linked with the condition observed in connection with the first component;
   b) displaying via the first graphical user interface the set of predetermined levels of priority identified by the search for allowing the inspector to perform a selection of a level of priority among the identified set of predetermined levels of priority, the selection of a level of priory among the set of predetermined levels of priority constituting a data entry operation in the fourth data input field.

* * * * *